(12) United States Patent
Kawashima et al.

(10) Patent No.: US 10,373,107 B2
(45) Date of Patent: Aug. 6, 2019

(54) GENERATION OF ACTIONS TO CORRECT PHYSICAL CONFIGURATIONS

(71) Applicant: SAP SE, Walldorf (DE)

(72) Inventors: Koji Kawashima, Cupertino, CA (US); Robert Moore, San Jose, CA (US)

(73) Assignee: SAP SE, Walldorf (DE)

( * ) Notice: Subject to any disclaimer, the term of this patent is extended or adjusted under 35 U.S.C. 154(b) by 692 days.

(21) Appl. No.: 14/983,030

(22) Filed: Dec. 29, 2015

(65) Prior Publication Data

US 2017/0185951 A1 Jun. 29, 2017

(51) Int. Cl.
G06Q 10/08 (2012.01)
G06K 9/64 (2006.01)
G06Q 20/20 (2012.01)

(52) U.S. Cl.
CPC ............ *G06Q 10/087* (2013.01); *G06K 9/64* (2013.01); *G06Q 10/08* (2013.01); *G06Q 10/083* (2013.01); *G06Q 10/0875* (2013.01); *G06Q 20/203* (2013.01)

(58) Field of Classification Search
CPC .. G06Q 10/087; G06Q 10/08; G06Q 10/0875; G06Q 30/018; G06K 9/64; G06K 7/10366
USPC .......................................................... 705/28
See application file for complete search history.

(56) References Cited

U.S. PATENT DOCUMENTS

2011/0011936 A1 1/2011 Morandi et al.
2015/0088703 A1 3/2015 Yan
2016/0134930 A1* 5/2016 Swafford ............. A47F 5/0068 725/80
2017/0178310 A1* 6/2017 Gormish ................. G06K 9/52

FOREIGN PATENT DOCUMENTS

WO 2009/027842 A2 3/2009

OTHER PUBLICATIONS

Ebster, Claus; Garaus, Marion. Store Design and Visual Merchandising, Second Edition: Store Design and Visual Merchandising, Second Edition. New York: Business Expert Press, Mar. 12, 2015. Chapter 3: Store Design Factors: Looking Good from Store Front to Store Back.*
"Communication: Extended European Search Report", European Patent Office, dated Mar. 31, 2017 (Mar. 31, 2017), for European Application No. 16002548.2-1958, 7pgs.

* cited by examiner

*Primary Examiner* — Nathan C Uber
*Assistant Examiner* — Fawaad Haider
(74) *Attorney, Agent, or Firm* — Buckley, Maschoff & Talwalkar LLC

(57) ABSTRACT

A system includes acquisition of an electronic image of items disposed in first locations, determination, based on the electronic image, of a visit image result comprising a first one or more linear groups, a first one or more facings per linear group and a first zero or more product identifiers per facing, determination of planogram reference data comprising a second one or more linear groups, a second one or more facings per linear group and a second zero or more product identifiers per facing, and determination of one or more corrective actions based on the visit image result and on the planogram reference data.

14 Claims, 32 Drawing Sheets

| LG | Facing 1 | Facing 2 | Facing 3 | Facing 4 | Facing 5 | Facing 6 |
|---|---|---|---|---|---|---|
| LG1 | C1 | P2 | P1 | P1 | P2 | P3 |
| | P1 | C2 | P2 | P1 | C1 | P3 |
| | C1 | C1 | | P1 | | |

FIG. 9a

| LG | Facing 1 | Facing 2 | Facing 3 | Facing 4 | Facing 5 | Facing 6 |
|---|---|---|---|---|---|---|
| LG1 | C1 (B) | P2 (B) | P1 (B) | P1 (B) | P2 (B) | P3 (B) |
| | P1 | C2 | P2 | | C1 | |
| | | C1 | | | | |

FIG. 9b

| LG | Facing 1 | Facing 2 | Facing 3 | Facing 4 | Facing 5 |
|---|---|---|---|---|---|
| LG1 | C1 | C2 | C3 | P1 | P2 |

FIG. 9c

| LG | Facing 1 | Facing 2 | | Facing 4 | Facing 5 |
|---|---|---|---|---|---|
| LG1 | C1 | C2 | | P1 | P2 |

*FIG. 12a*

| LG | Facing 1 | Facing 2 | Facing 3 | Facing 4 | Facing 5 | |
|---|---|---|---|---|---|---|
| | C1 (B) | P2 (B) | P1 (B) | P1 (B) | P2 (B) | |
| LG1 | P1 | C2 | P2 | | C1 | |
| | | C1 | | | | |

*FIG. 12b*

| # | Facing 1 | Facing 2 | Facing 3 | Facing 4 | Facing 5 |
|---|---|---|---|---|---|
| 1 | C1 (B) | P2 (B) | P1 (B) | P1 (B) | P2 (B) |
| 2 | C1 (B) | P2 (B) | P1 (B) | P1 (B) | C1 |
| 3 | C1 (B) | P2 (B) | P2 | P1 (B) | P2 (B) |
| 4 | C1 (B) | P2 (B) | P2 | P1 (B) | C1 |
| 5 | C1 (B) | C2 | P1 (B) | P1 (B) | P2 (B) |
| 6 | C1 (B) | C2 | P1 (B) | P1 (B) | C1 |
| 7 | C1 (B) | C2 | P2 | P1 (B) | P2 (B) |
| 8 | C1 (B) | C2 | P2 | P1 (B) | C1 |
| 9 | C1 (B) | C1 | P1 (B) | P1 (B) | P2 (B) |
| 10 | C1 (B) | C1 | P1 (B) | P1 (B) | C1 |
| 11 | C1 (B) | C1 | P2 | P1 (B) | P2 (B) |
| 12 | C1 (B) | C1 | P2 | P1 (B) | C1 |
| 13 | P1 | P2 (B) | P1 (B) | P1 (B) | P2 (B) |
| 14 | P1 | P2 (B) | P1 (B) | P1 (B) | C1 |
| 15 | P1 | P2 (B) | P2 | P1 (B) | P2 (B) |
| 16 | P1 | P2 (B) | P2 | P1 (B) | C1 |
| 17 | P1 | C2 | P1 (B) | P1 (B) | P2 (B) |
| 18 | P1 | C2 | P1 (B) | P1 (B) | C1 |
| 19 | P1 | C2 | P2 | P1 (B) | P2 (B) |
| 20 | P1 | C2 | P2 | P1 (B) | C1 |
| 21 | P1 | C1 | P1 (B) | P1 (B) | P2 (B) |
| 22 | P1 | C1 | P1 (B) | P1 (B) | C1 |
| 23 | P1 | C1 | P2 | P1 (B) | P2 (B) |
| 24 | P1 | C1 | P2 | P1 (B) | C1 |

*FIG. 12c*

| # | Facing 1 | Facing 2 | Facing 3 | Facing 4 | Facing 5 |
|---|---|---|---|---|---|
| 1 | C1 (B) | P2 (B) | P1 (B) | P1 (B) | P2 (B) |
| 2 | C1 (B) | P2 (B) | P1 (B) | P1 (B) | C1 |
| 3 | C1 (B) | P2 (B) | P2 | P1 (B) | P2 (B) |
| 4 | C1 (B) | P2 (B) | P2 | P1 (B) | C1 |
| 5 | C1 (B) | C2 | P1 (B) | P1 (B) | P2 (B) |
| 6 | C1 (B) | C2 | P1 (B) | P1 (B) | C1 |
| 7 | C1 (B) | C2 | P2 | P1 (B) | P2 (B) |
| 8 | C1 (B) | C2 | P2 | P1 (B) | C1 |
| 9 | C1 (B) | C1 | P1 (B) | P1 (B) | P2 (B) |
| 10 | C1 (B) | C1 | P1 (B) | P1 (B) | C1 |
| 11 | C1 (B) | C1 | P2 | P1 (B) | P2 (B) |
| 12 | C1 (B) | C1 | P2 | P1 (B) | C1 |
| 13 | P1 | P2 (B) | P1 (B) | P1 (B) | P2 (B) |
| 14 | P1 | P2 (B) | P1 (B) | P1 (B) | C1 |
| 15 | P1 | P2 (B) | P2 | P1 (B) | P2 (B) |
| 16 | P1 | P2 (B) | P2 | P1 (B) | C1 |
| 17 | P1 | C2 | P1 (B) | P1 (B) | P2 (B) |
| 18 | P1 | C2 | P1 (B) | P1 (B) | C1 |
| 19 | P1 | C2 | P2 | P1 (B) | P2 (B) |
| 20 | P1 | C2 | P2 | P1 (B) | C1 |
| 21 | P1 | C1 | P1 (B) | P1 (B) | P2 (B) |
| 22 | P1 | C1 | P1 (B) | P1 (B) | C1 |
| 23 | P1 | C1 | P2 | P1 (B) | P2 (B) |
| 24 | P1 | C1 | P2 | P1 (B) | C1 |

*FIG. 12d*

| # | Facing 1 | Facing 2 | Facing 3 | Facing 4 | Facing 5 | Remark |
|---|---|---|---|---|---|---|
| 1 | C1 (B) | P2 (B) | P1 (B) | | | |
| 2 | C1 (B) | P2 (B) | P1 (B) | | | Same as #1 |
| 3 | C1 (B) | P2 (B) | | P1 (B) | | |
| 4 | C1 (B) | P2 (B) | | P1 (B) | | Same as #3 |
| 5 | C1 (B) | C2 | P1 (B) | | P2 (B) | |
| 6 | C1 (B) | C2 | P1 (B) | | | Same as #5 |
| 7 | C1 (B) | C2 | P2 | P1 (B) | | |
| 8 | C1 (B) | C2 | P2 | P1 (B) | | Same as #7 |
| 9 | C1 (B) | | P1 (B) | | P2 (B) | Same as #5 |
| 10 | C1 (B) | | P1 (B) | | | |
| 11 | C1 (B) | | P2 | P1 (B) | | Same as #7 |
| 12 | C1 (B) | | P2 | P1 (B) | | Same as #7 |
| 13 | P1 | P2 (B) | | | | |
| 14 | P1 | P2 (B) | | | C1 | |
| 15 | P1 | P2 (B) | | | | Same as #13 |
| 16 | P1 | P2 (B) | | | C1 | Same as #14 |
| 17 | P1 | C2 | | | P2 (B) | |
| 18 | P1 | C2 | | | C1 | |
| 19 | P1 | C2 | P2 | | | |
| 20 | P1 | C2 | P2 | | | Same as #19 |
| 21 | P1 | C1 | | | P2 (B) | |
| 22 | P1 | C1 | | | | |
| 23 | P1 | C1 | P2 | | | |
| 24 | P1 | C1 | P2 | | | Same as #23 |

*FIG. 12e*

| # | Facing 1 | Facing 2 | Facing 3 | Facing 4 | Facing 5 | Weight | Remark |
|---|---|---|---|---|---|---|---|
| 1 | C1 (B) | P2 (B) | P1 (B) | | | 1.67 | |
| 3 | C1 (B) | P2 (B) | | P1 (B) | | 1.42 | Same as #1, lesser Weight value |
| 5 | C1 (B) | C2 | P1 (B) | | P2 (B) | 1.83 | |
| 7 | C1 (B) | C2 | P2 | P1 (B) | | 2.32 | |
| 10 | C1 (B) | | P1 (B) | | | 1.06 | |
| 13 | P1 | P2 (B) | | | | 1.22 | |
| 14 | P1 | P2 (B) | | | C1 | 1.53 | |
| 17 | P1 | C2 | | | P2 (B) | 1.43 | |
| 18 | P1 | C2 | | | C1 | 1.66 | |
| 19 | P1 | C2 | P2 | | | 1.01 | Same as #17, lesser Weight value |
| 21 | P1 | C1 | | | P2 (B) | 1.32 | |
| 22 | P1 | C1 | | | | 1.77 | |
| 23 | P1 | C1 | P2 | | | 1.20 | Same as #21, lesser Weight value |

*FIG. 12f*

| # | Facing 1 | Facing 2 | Facing 3 | Facing 4 | Facing 5 | Weight |
|---|---|---|---|---|---|---|
| 1 | C1 (B) | P2 (B) | P1 (B) | | | 1.67 |
| 5 | C1 (B) | C2 | P1 (B) | | P2 (B) | 1.83 |
| 7 | C1 (B) | C2 | P2 | P1 (B) | | 2.32 |
| 10 | C1 (B) | | P1 (B) | | | 1.06 |
| 13 | P1 | P2 (B) | | | | 1.22 |
| 14 | P1 | P2 (B) | | | C1 | 1.53 |
| 17 | P1 | C2 | | | P2 (B) | 1.43 |
| 18 | P1 | C2 | | | C1 | 1.66 |
| 21 | P1 | C1 | | | P2 (B) | 1.32 |
| 22 | P1 | C1 | | | | 1.77 |

*FIG. 12g*

| LG | # | Facing 1 | Facing 2 | Facing 3 | Facing 4 | Facing 5 | Weight |
|---|---|---|---|---|---|---|---|
| LG1 | 1 | C1 (B) | P2 (B) | P1 (B) | | | 1.67 |
| | 5 | C1 (B) | C2 | P1 (B) | | P2 (B) | 1.83 |
| | 7 | C1 (B) | C2 | P2 | P1 (B) | | 2.32 |
| | 10 | C1 (B) | | P1 (B) | | | 1.06 |
| | 13 | P1 | P2 (B) | | | | 1.22 |
| | 14 | P1 | P2 (B) | | | C1 | 1.53 |
| | 17 | P1 | C2 | | | P2 (B) | 1.43 |
| | 18 | P1 | C2 | | | C1 | 1.66 |
| | 21 | P1 | C1 | | | P2 (B) | 1.32 |
| | 22 | P1 | C1 | | | | 1.77 |

*FIG. 14a*

| LG | Facing 1 | Facing 2 | Facing 3 | Facing 4 | Facing 5 |
|---|---|---|---|---|---|
| LG1 | C1 | C2 | C3 | P1 | P2 |

*FIG. 14b*

| LG | # | Facing 1 | Facing 2 | Facing 3 | Facing 4 | Facing 5 | CFO | CFI | Weight |
|---|---|---|---|---|---|---|---|---|---|
| LG1 | 1 | C1 (B) | P2 (B) | P1 (B) | | | 2 | 3 | 1.67 |
| | 5 | C1 (B) | C2 | P1 (B) | | P2 (B) | 4 | 4 | 1.83 |
| | 7 | C1 (B) | C2 | P2 | P1 (B) | | 3 | 4 | 2.32 |
| | 10 | C1 (B) | | P1 (B) | | | 2 | 2 | 1.06 |
| | 13 | P1 | P2 (B) | | | | 2 | 2 | 1.22 |
| | 14 | P1 | P2 (B) | | | C1 | 2 | 3 | 1.53 |
| | 17 | P1 | C2 | | | P2 (B) | 2 | 3 | 1.43 |
| | 18 | P1 | C2 | | | C1 | 1 | 3 | 1.66 |
| | 21 | P1 | C1 | | | P2 (B) | 2 | 3 | 1.32 |
| | 22 | P1 | C1 | | | | 1 | 2 | 1.77 |

*FIG. 14c*

| LG | Facing 1 | Facing 2 | Facing 3 | Facing 4 | Facing 5 | Facing 6 |
|---|---|---|---|---|---|---|
| LG1 | C1 | C2 | P1 | | P2 | |

*FIG. 15a*

| LG | Facing 1 | Facing 2 | Facing 3 | Facing 4 | Facing 5 | Facing 6 |
|---|---|---|---|---|---|---|
| LG1 | C1 | C2 | P1 | P1 (ADD) | P2 | P3 (ADD) |

*FIG. 15b*

| LG | Facing 1 | Facing 2 | Facing 3 | Facing 4 | Facing 5 |
|---|---|---|---|---|---|
| LG1 | C1 | C2 | C3 | P1 | P2 |

FIG. 17a

| LG | Facing 1 | Facing 2 | Facing 3 | Facing 4 | Facing 5 | Facing 6 |
|---|---|---|---|---|---|---|
| LG1 | C1 | C2 | P1 | P1 (ADD) | P2 | P3 (ADD) |

FIG. 17b

| LG | Facing 1 | Facing 2 | Facing 3 | Facing 4 | Facing 5 |
|---|---|---|---|---|---|
| LG1 | C1 (OK) | C2 (OK) | C3 | P1 (OK) | P2 (OK) |

FIG. 17c

| LG | Facing 1 | Facing 2 | Facing 3 | Facing 4 | Facing 5 |
|---|---|---|---|---|---|
| LG1 | C1 (OK) | C2 (OK) | C3 (MISS) | P1 (OK) | P2 (OK) |

FIG. 17d

| LG  | Facing 1 | Facing 2 | Facing 3 | Facing 4 | Facing 5 | Facing 6 |
|-----|----------|----------|----------|----------|----------|----------|
| LG1 |          |          | C3-OOS   |          |          |          |

FIG. 19a

| LG  | Facing 1 | Facing 2 | Facing 3 | Facing 4 | Facing 5 | Facing 6 |
|-----|----------|----------|----------|----------|----------|----------|
| LG1 |          |          |          | P1-EXF   |          | P3-EXF   |

FIG. 19b

GENERATION OF ACTIONS TO CORRECT PHYSICAL CONFIGURATIONS

BACKGROUND

Many industrial and commercial processes are dependent upon the proper configuration of physical items involved in such processes. For example, an automated warehouse fulfillment system requires that each item of stock in a warehouse is located at its proper position. In the case of consumer product manufacturers, product sales and consumer satisfaction depend on the existence and proper location of products on retail store shelves.

Currently, product representatives visit retail stores to survey product displays, correct or update product positions, and either re-stock products with items that are available in store stock rooms or place orders for future delivery. In cases where a product line and corresponding in-store display include hundreds of items located in long store aisles, the tasks of correctly assessing the locations of products, moving products, and re-stocking products are extremely time-consuming as well as ad-hoc. Even ignoring inevitable human inefficiencies and errors, conventional systems fail to provide an efficient system to determine and guide correction of errors in the physical configuration of items, such as items on a store shelf.

BRIEF DESCRIPTION OF THE DRAWINGS

FIGS. 9a-9c are tabular representations illustrating generation of raw result lists according to some embodiments.

FIGS. 12a through 12g illustrate creation of matching item combinations according to some embodiments.

FIGS. 14a through 14c illustrate selection of a best matching item combination according to some embodiments.

FIGS. 15a and 15b illustrate a process to determine items located in facing spaces according to some embodiments.

FIGS. 17a through 17d illustrate a process to determine items which should be located in facing spaces according to some embodiments.

FIGS. 19a and 19b illustrate a process to determine corrective actions according to some embodiments.

DETAILED DESCRIPTION

The following description is provided to enable any person in the art to make and use the described embodiments. Various modifications, however, will remain readily apparent to those in the art.

Figure 1:
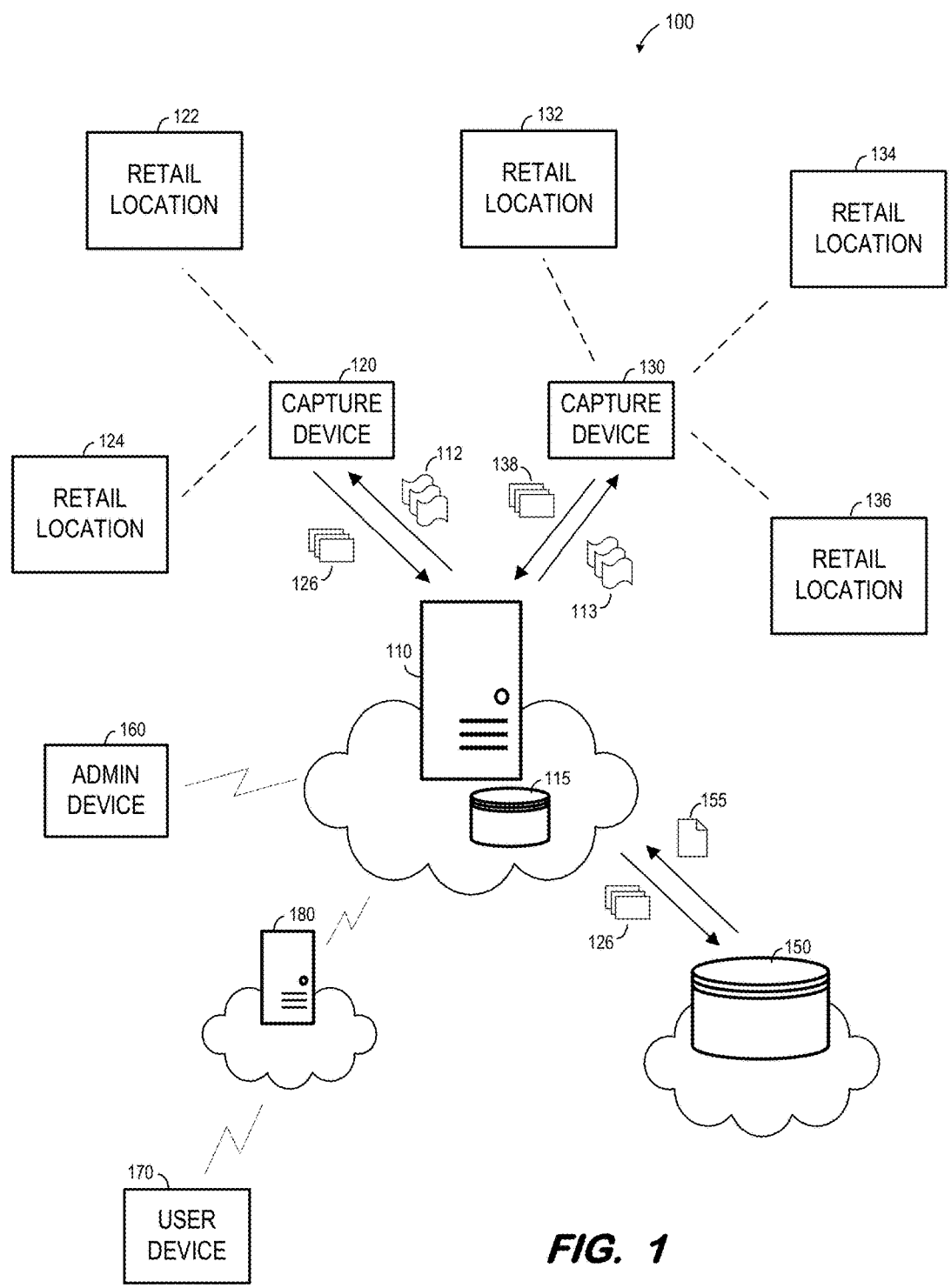
FIG. 1 is a block diagram of a system according to some embodiments.

FIG. 1 is a block diagram of system 100 according to some embodiments. Some embodiments of system 100 may efficiently identify product locations and determine actions to conform the product locations to a desired layout. System 100 embodies algorithms which are not analogous to any known manual or computerized system.

System 100 includes application server 110, which may be cloud-based, on-premise, and/or otherwise accessible to remote or local devices via one or more computer networks. Database 115 may store data for access by application server 110. As will be described in detail below, the data may include shelf images, visit image results, planogram reference data, and any other intermediate data structures used in the below-described processes. Application server 110 may comprise any combination of Web server, a database application server, and other type of one or more computing systems.

Database 115 may comprise a relational database, a multi-dimensional database, an eXtendable Markup Language (XML) document, or any other data storage system storing structured and/or unstructured data. The data of database 115 may be distributed among several relational databases, multi-dimensional databases, and/or other data sources.

Database 115 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, the data of database 115 comprises one or more of conventional tabular data, row-based data stored in row format, column-based data stored in columnar format, and object-based data. Database 115 may also or alternatively support multi-tenancy by providing multiple logical database systems which are programmatically isolated from one another. Moreover, the data of database 115 may be indexed and/or selectively replicated in an index to allow fast searching and retrieval thereof.

Capture devices 120 and 130 may comprise any type of device to obtain still or video image data from retail locations 122, 124, 132, 134 and 136. In some embodiments, retail locations 122, 124, 132, 134 and 136 may comprise any physical location at which goods are visible to an intended consumer. Embodiments are not limited to this scenario.

Examples of capture devices 120 and 130 include, but are not limited to, a smartphone, a tablet computer, a smartwatch, a notebook computer, a camera, a fixed camera, a webcam, a multifunction robot, a drone, and sensors. Capture devices 120 and 130 may store and execute program code of a software application for presenting user interfaces to allow interaction with server 110. Presentation of a user interface may comprise any degree or type of rendering. For example, capture device 120 may execute a Web Browser to receive a Web page (e.g., in HTML format) from application server 110, and may render and present the Web page according to known protocols. Each of capture devices 120 and 130 may also or alternatively present user interfaces by executing a standalone executable file (e.g., an .exe file) or code (e.g., a JAVA applet) within a virtual machine.

Administrator 160 may also store and execute program code of a software application for presenting user interfaces to allow interaction with server 110, via any known protocol. Such interaction may include uploading new planograms to database 115 and executing backup operations.

User device 170 may interface with server 180 to receive dashboard and reporting services, based on data stored in database 115. These services may also provide analytical analysis of collected data, for example in conjunction with point of sale data received from the retail locations.

Database service 150 includes product images and associated Universal Product Codes (UPCs). Database service 150 may receive images and return data indicating products shown in the images and the locations of such products relative to one another.

FIG. 1 represents a logical architecture for describing systems according to some embodiments, and actual implementations may include more or different components, system and networks arranged in other manners. Each element of system 100 may provide functions other than those attributed thereto herein, and these functions may be provided by more than one device, located local to or remote from one another.

Figure 2:
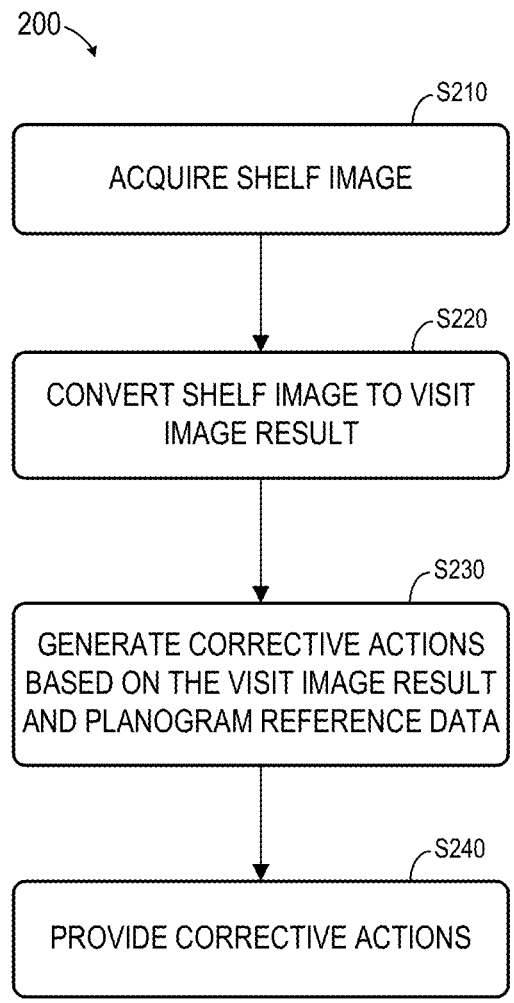
FIG. 2 is a flow diagram of a process according to some embodiments.

FIG. 2 comprises a flow diagram of process 200 according to some embodiments. In some embodiments, various elements of system 100 execute program code to perform process 200. All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a shelf image is acquired at S210. According to some embodiments, capture device 120 transmits images 126 to application server 110 at S210. For example, according to some embodiments, a user operates capture device 120 to acquire images 126 of a shelf at retail location 122. Capture device 120 may acquire the images using a general-purpose camera application or a dedicated application intended for use with the system described herein.

Figure 3:
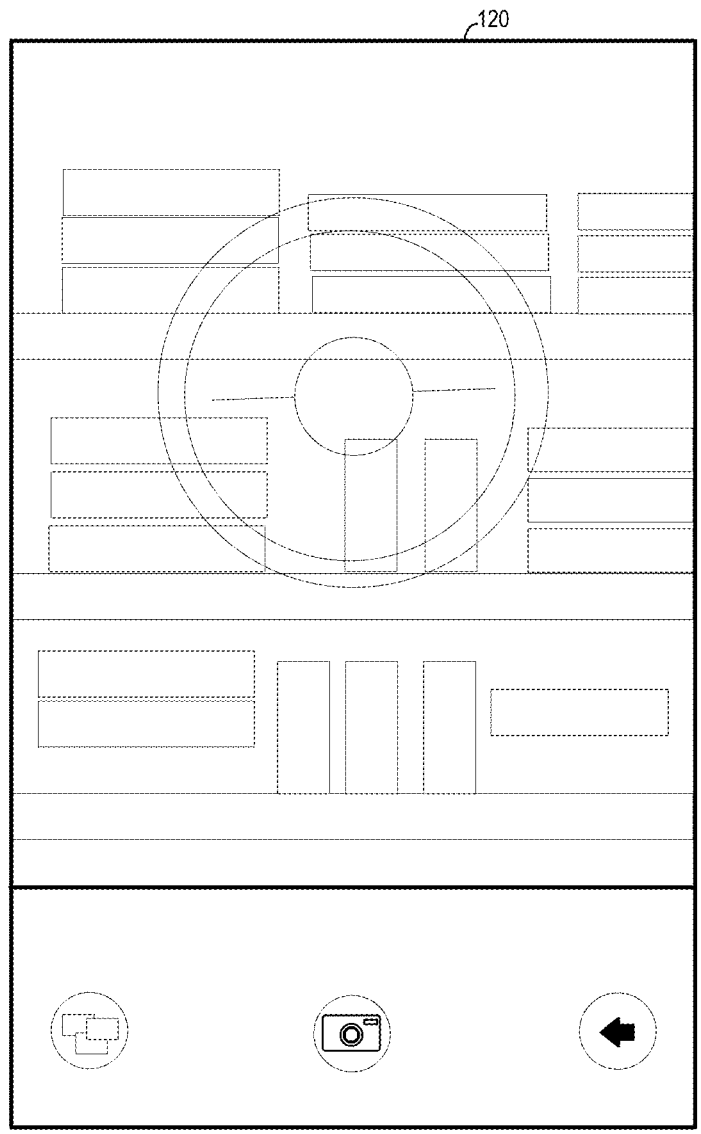
FIG. 3 is a view of a portable device presenting a camera interface to acquire an image according to some embodiments.

FIG. 3 illustrates capture device 120 according to some embodiments. Capture device 120 presents a user interface for capturing an image of items on three shelves of retail location 126. According to some embodiments, capture device 120 acquires several images of adjacent portions of shelving and processes the images in order to "stitch" the images into a single larger image. This functionality may be particularly useful if the product line or shelf space of interest occupies a large area.

Next, at S220, the image is converted to a visit image result. A visit image result consists of UPCs and information indicating relative locations of products corresponding to the UPCs. In some embodiments, application server 110 forwards images 126 to database service 150 and receives visit image result 155 in return. Database service 150 may be provided by a third party, but embodiments are not limited thereto.

Corrective Actions (CAs) are generated at S230 based on the visit image result and planogram reference data. Planogram reference data specifies expected item count, shelf configurations and sizes, product UPC's and corresponding x-y coordinates. Planogram reference data is known in the art and may be produced and received from known planogram design applications.

Corrective actions may comprise descriptions of differences between the actual locations of products and the locations specified by the planogram reference data. Examples of corrective actions include:

Out of Stock (OOS)—product UPC not present at all in facing space on shelf

Missing Facing (MIF)—product UPC not present partially in facing space on shelf

Figure 4:
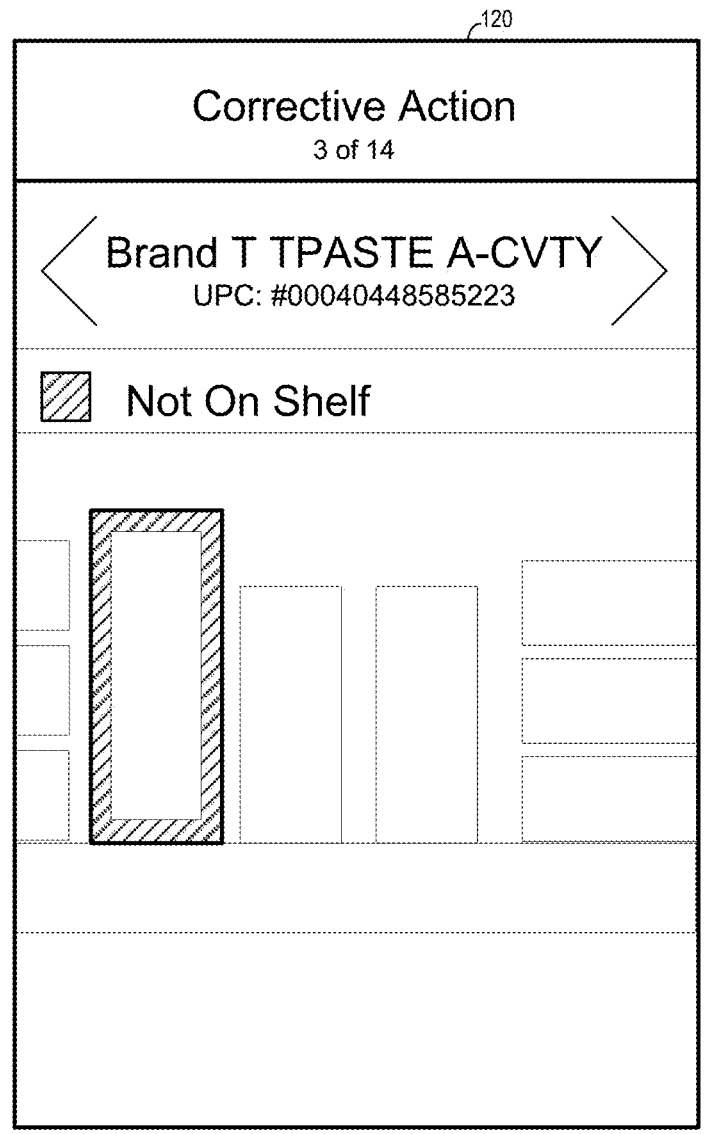
FIG. 4 is a view of a portable device presenting an interface relating to corrective actions according to some embodiments.

Extra Facing (EXF)—product UPC present more than necessary in facing space on shelf Shelf Placement or Position Error 1 (PE1)—product UPC that is in facing space on shelf Mixed In Facing or Position Error 2 (PE2)—product UPC mixed in facing space on shelf Recall Product (RCL)—product UPC in facing space on shelf is on manufacturer's Recall List The corrective actions are provided at S240. Continuing the present example, corrective actions 112 may be transmitted to capture device 120 by application server 110. Capture device 120 may execute an application to view corrective actions 112 in an intuitive and helpful way. For example, FIG. 4 illustrates capture device 120 displaying an interface which presents corrective actions according to some embodiments. The interface provides an image of a portion of a shelf and an overlaid graphical indicator indicating that an item (denoted by an abbreviation and its product UPC) is not in its designated position on the shelf. The image may be a portion of one of images 126 acquired at S210.

Figure 5:
FIG. 5 illustrates a core data framework for caching data on a portable device according to some embodiments.

FIG. 5 illustrates a framework for caching data on a capture device according to some embodiments. As shown, the framework includes structures for storing the aforementioned images (including stitched images) and corrective actions, as well as store-related and visit-related data.

Figure 6:
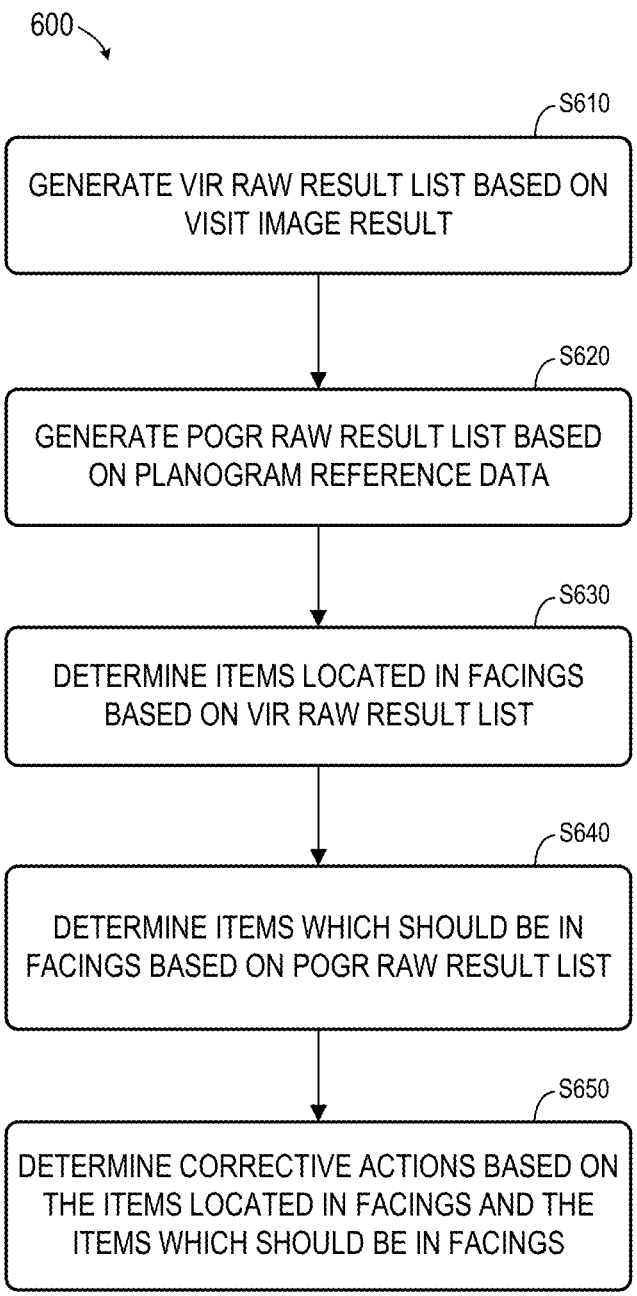
FIG. 6 is a flow diagram of a process to detect a configuration and determine corrective actions according to some embodiments.

FIG. 6 is a flow diagram of process 600 to perform S230 of process 200 according to some embodiments. Process 600 may be performed by application server 110 based on visit image results 155 received from database services 150 and on planogram reference data stored in database 115.

Initially, a visit image result raw result list is generated at S610 based on the visit image result of S220. As mentioned above, the visit image result is determined based on images of store shelves, and consists of UPCs and information indicating relative locations of corresponding products.

Figure 7:
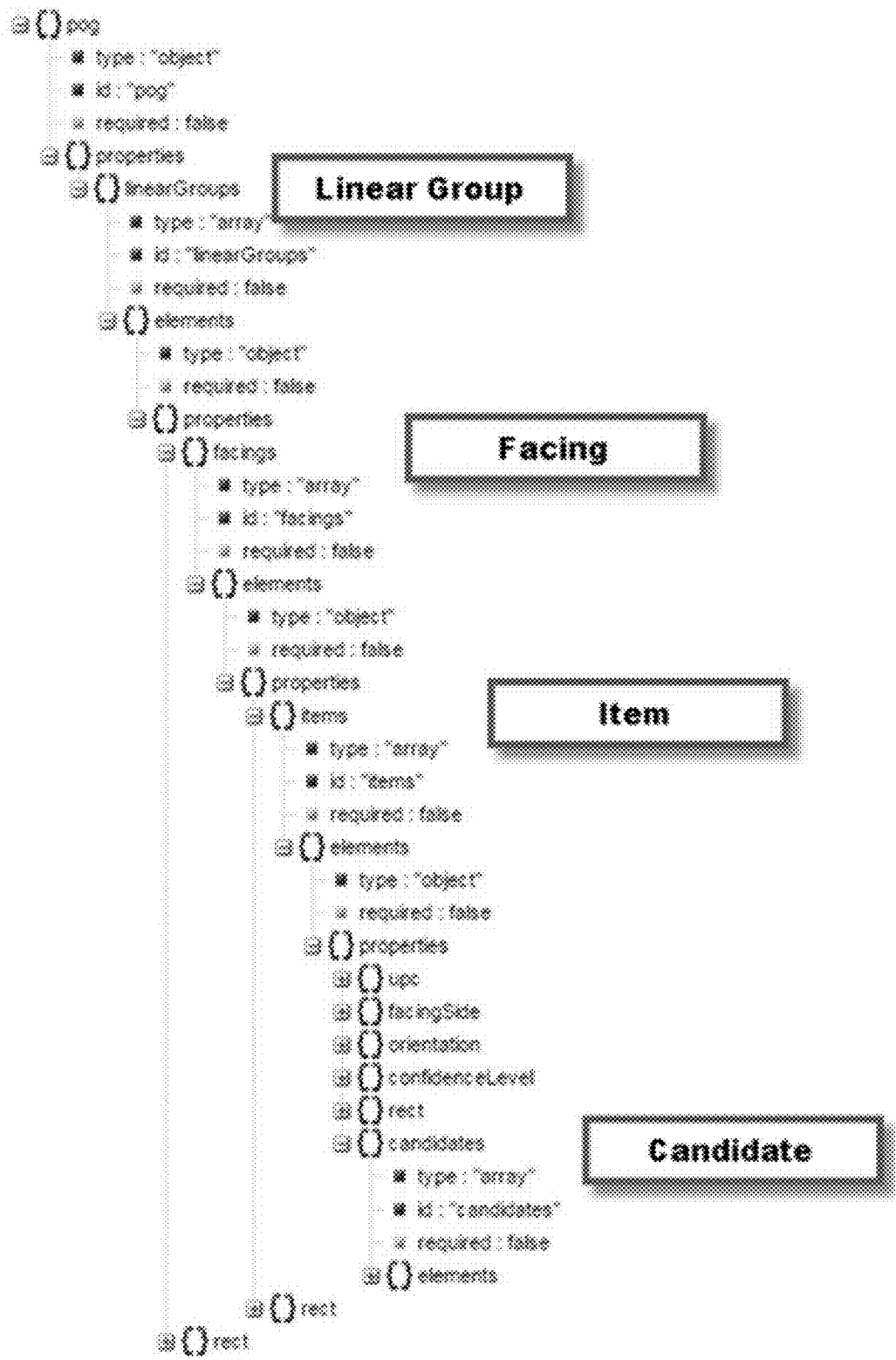
FIG. 7 illustrates a JavaScript Object Notation schema according to some embodiments.

According to some embodiments, processing is facilitated by specifying a format for the visit image result. FIG. 7 illustrates such a format in JavaScript Object Notation. As shown, the visit image result (generated, for example, by database services 150) creates linear groups, each of which includes one or more facings. Each facing may include zero or more items. Moreover, each item of a facing may be associated with a UPC, orientation, confidence level (of whether item determination is accurate) and other candidate items. A confidence level may be determined using any suitable system that is or becomes known.

Generally, a linear group may consist of a shelf (or a portion thereof), while a facing is a sub-portion of a linear group. A facing may include more than one item (e.g., three toothpaste packages stacked on one another).

Figure 8:
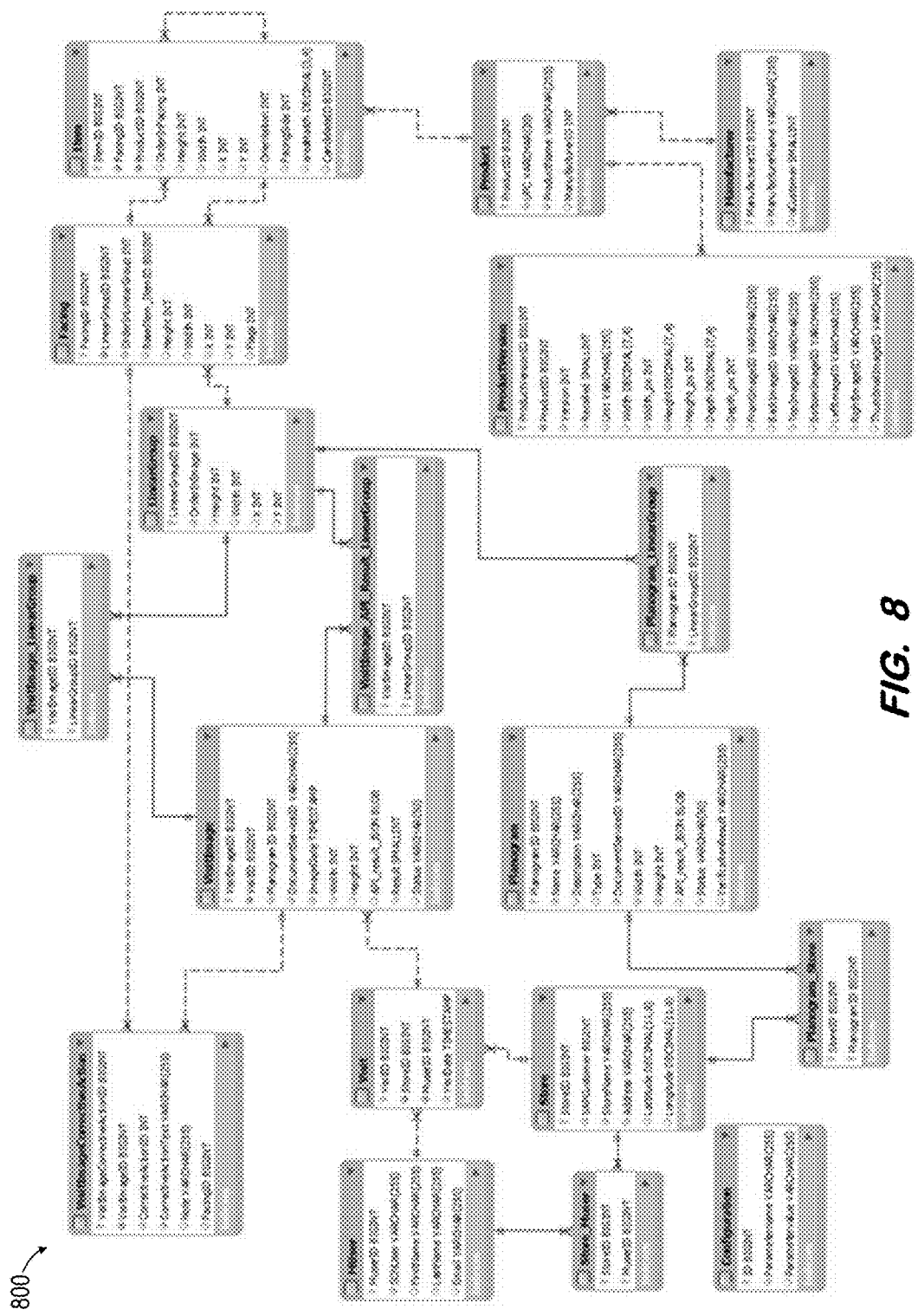
FIG. 8 illustrates a database table structure according to some embodiments.

FIG. 8 illustrates schema 800 according to some embodiments, and including linear groups, facings and items as described above. Schema 800 also incorporates data relating to visit images, planograms, visits and stores. Accordingly, schema 800 may describe data of database 115, which is used by application server 110 to provide the functions described herein.

FIG. 9*a* illustrates one linear group LG1 of a visit image result according to one example. Linear group LG1 conforms to the facing and item hierarchy of FIG. 7, wherein each linear group (e.g., LG#) may include more than one facing and each facing (e.g., Facing #) may include more than one item (e.g., P# or C#). Items denoted "C#" have been identified as "candidates" at S220 because their correct identification is less certain than items denoted "P#", and may be treated differently than items denoted "P#" in subsequent processing.

According to some embodiments, the visit image result only includes candidate items which are produced by a particular manufacturer (e.g., a client), and items produced by other manufacturers are filtered out or otherwise not included.

In order to generate a visit image result raw list, duplicates are removed from each facing of a linear group. Next, items located at the bottom, or lowest point, of their corresponding facings are marked "(B)". FIG. 9*b* illustrates this processing as applied to LG1 of FIG. 9*a*. LG1 of FIG. 9*b* is appended to the visit image result raw result list and the process repeats for each linear group of the visit image result.

According to some embodiments in which the visit image result may include candidate items which are produced by several manufacturers, generation of the visit image result raw list may comprise removing, from each linear group, all candidate items which are produced by manufacturers other than a manufacturer of interest (e.g., a client).

At S620, a planogram raw result list is generated based on the aforementioned planogram reference data. The planogram reference data also includes linear groups, facings and items as described above. As also described above, for each linear group, duplicates are removed from each facing and the resulting linear group is appended to the current planogram raw result list. FIG. 9*c* illustrates a linear group of the planogram reference data after removal of duplicate items.

Figure 10:
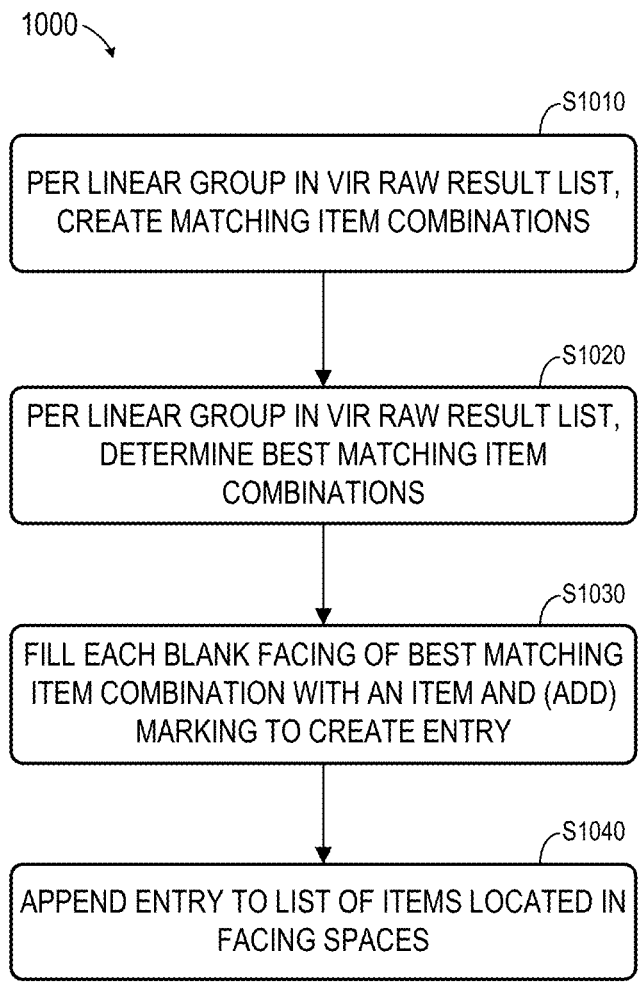
FIG. 10 is a flow diagram of a process to determine items located in facing spaces according to some embodiments.
Figure 11:
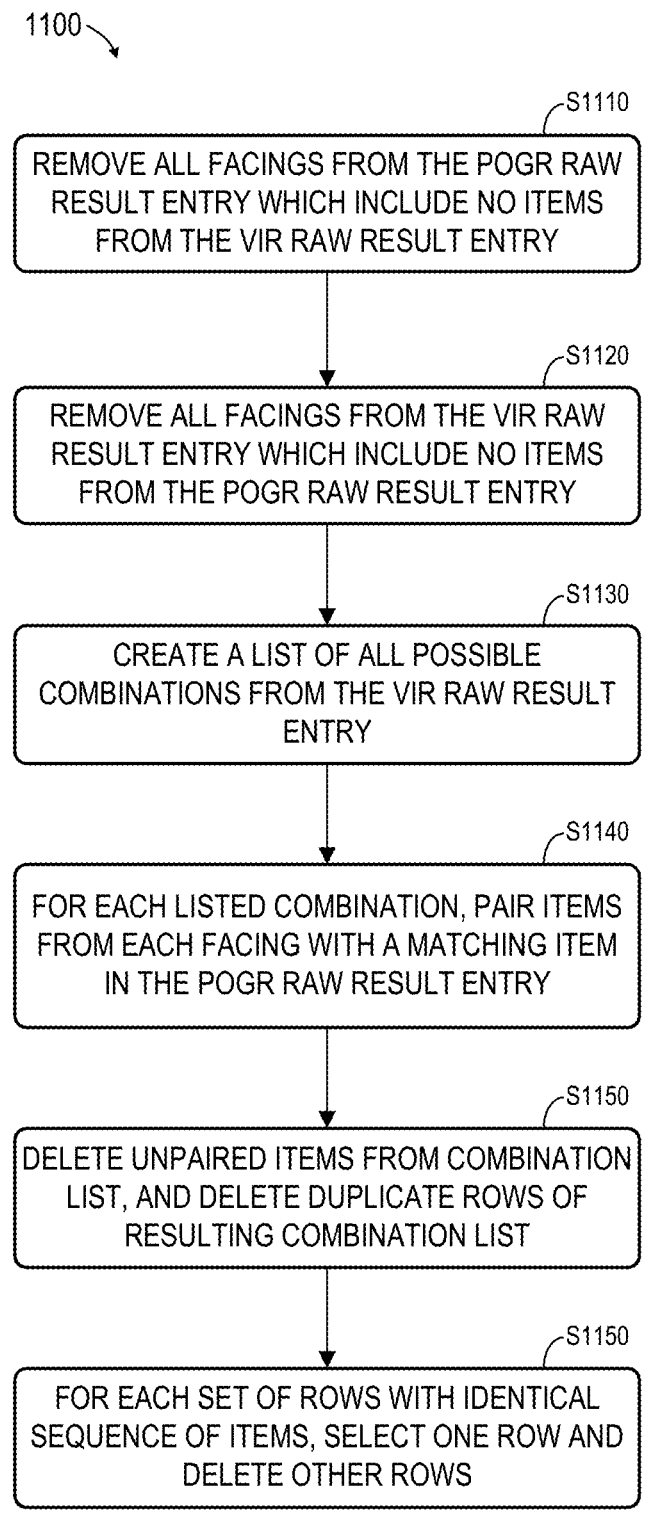
FIG. 11 is a flow diagram of a process to create matching item combinations according to some embodiments.

The items actually located in facings are determined at S630 based on the visit image result raw result list. FIG. 10 is a flowchart of process 1000 to perform S630 according to some embodiments. At S1010, matching item combinations are created for each linear group in the visit image raw result list.

FIG. 11 and FIGS. 12*a*-12*g* illustrate a process for creating matching item combinations for a linear group according to some embodiments of S1010. Initially, at S1110 of process 1100, all facings from an entry of the planogram raw result list are removed which include no items from corresponding entry of the visit image result raw list.

For example, FIGS. 9*b* and 9*c* include an entry of the visit image result raw list and a corresponding entry of the planogram raw result list. Facing 3 of the planogram raw result list entry of FIG. 9*c* does not include any items which are included in the visit image result raw list of FIG. 9*b*. In other words, item C3 of Facing 3 of the planogram raw result list entry is not included in the visit image result raw list of FIG. 9*b*. Accordingly, Facing 3 is removed from the planogram raw result list entry at S1110 as shown in FIG. 12*a*.

Next, at S1120, all facings from the entry of the visit image result raw list are removed which include no items from the corresponding entry of the planogram raw result list. Returning to FIGS. 9*b* and 9*c*, include an entry of the visit image result raw list and a corresponding entry of the planogram raw result list. Facing 6 of the visit image result list entry of FIG. 9*b* does not include any items which are included in the planogram raw result list entry of FIG. 9*c*. Conversely, item P3 of Facing 6 of the visit image result raw list entry is not included in the planogram raw result list entry of FIG. 9*c*. Facing 6 is therefore removed from the visit image result raw result list entry at S1120 as shown in FIG. 12*b*.

At S1130, a list of all possible combinations is created from the visit image result raw result list entry output from S1120. FIG. 12*c* illustrates such a list, based on the visit image result raw result list entry of FIG. 12*b*. The FIG. 12*c* list illustrates all possible combinations of the FIG. 12*b* linear group, in which one item from each facing of the FIG. 12*b* linear group is associated with each facing.

For each listed combination, it is then determined at S1140 whether an item of a facing matches an item in the planogram raw result list entry. An item is marked in the combination after a match is found in the corresponding planogram raw result list entry, and a matched item is marked only once per combination. FIG. 12*d* illustrates matched and marked items of a combination list according to the present example. Regarding entry #1, items C1, P2 and P1 of Facings 1, 2 and 3 are marked because these items are present in the corresponding planogram raw result list entry of FIG. 12*a*. Items P1 and P2 of Facings 4 and 5 are not marked because these items have already been marked as matching in Facings 3 and 2, respectively.

Next, at S1150, unpaired items are deleted from the combination list and duplicate rows are deleted from the resulting combination list. FIG. 12*e* illustrates these item and row deletions according to the present example. Lastly, for each set of rows which include an identical sequence of items, one row of the set is selected and the other rows of the set are deleted.

FIG. 12*f* illustrates that entry #3 includes an identical sequence of items as entry #1, entry #19 includes an identical sequence of items as entry #17, and entry #23 includes an identical sequence of items as entry #21. Of these rows, entries #3, #19 and #23 are selected for deletion at S1150. Selection according to this embodiment is based on a weight assigned to each entry. In the present example, the weight of an entry is a total of an "Area Match" value assigned to each item of the entry. The value is provided by the visit image result entry corresponding to the item. Moreover, in some embodiments, an additional weight (e.g., 0.2) is assigned to items marked "(B)".

FIG. 12*g* shows the resulting list of matching combinations for the linear group LG1. As described with respect to S1010, process 1100 is performed for each linear group of the visit image result raw result list.

Figure 13:
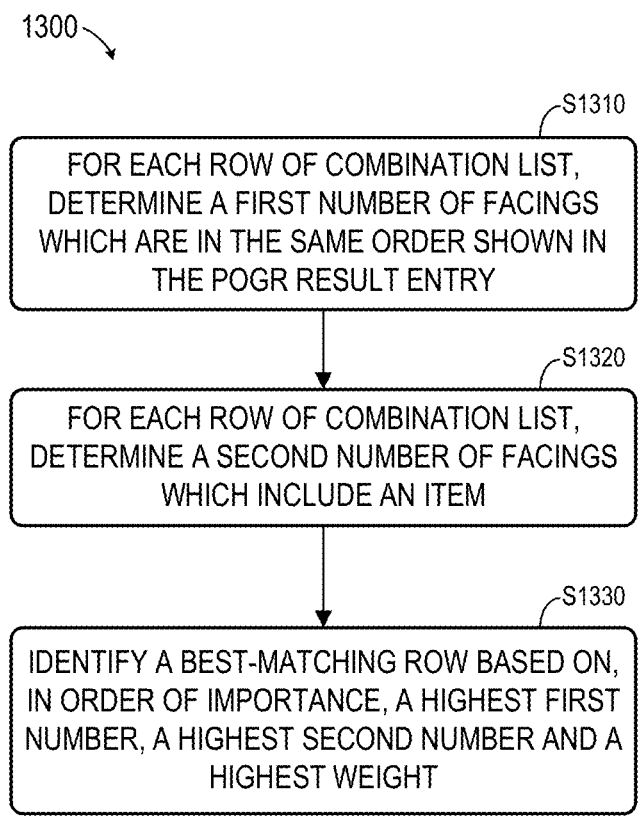
FIG. 13 is a flow diagram of a process to select a best matching item combination according to some embodiments.

Returning to process 1000, best matching item combinations of the list of matching combinations are determined at S1020, for each linear group of the visit image result raw result list. FIG. 13 is a flowchart of process 1300 to perform S1020 according to some embodiments.

At S1310, for each row of the combination list, a first number of facings which are in the same order shown in the planogram raw result list is determined. FIG. 14a shows the combination list of FIG. 12g, and FIG. 14b shows the planogram raw result list of the corresponding linear group LG1. FIG. 14c shows added column CFO (i.e., Count Facings in Order), which indicates the numbers determined at S1310.

Next, at S1320 and also for each row of the combination list, a second number of facings which include an item is determined. This second number is reflected in column CFI (i.e., Count Facings with Item) of FIG. 14c.

A best-matching row of the combination list is identified at S1330. According to some embodiments, the best-matching row is identified based on, in order of importance, a highest number in column CFO, a highest number in column CFI, and a highest weight. In the present example, entry #5 is selected due to its CFO value of 4.

S1010 of process 1000 has been described in detail with respect to process 1100 and S1020 has been described in detail with respect to process 1300. Returning to process 1000, each blank facing of the best-matching item combination is filled with an item and marked "(ADD)" at S1030. FIG. 15a shows the FIG. 15b shows the selected best-matching entry of FIG. 14c, and FIG. 15b shows Facings 4 and 6 of the selected best-matching entry filled with items P1 and P3, respectively, and marked (ADD). In some embodiments, an item used to fill a blank facing is an item which occurs most often in the entry. If two or more items have a same number of occurrences, the item closer to the bottom of the facing is chosen. The resulting entry is added to the list of items which are located in facing spaces for the corresponding linear group at S1040.

Figure 16:
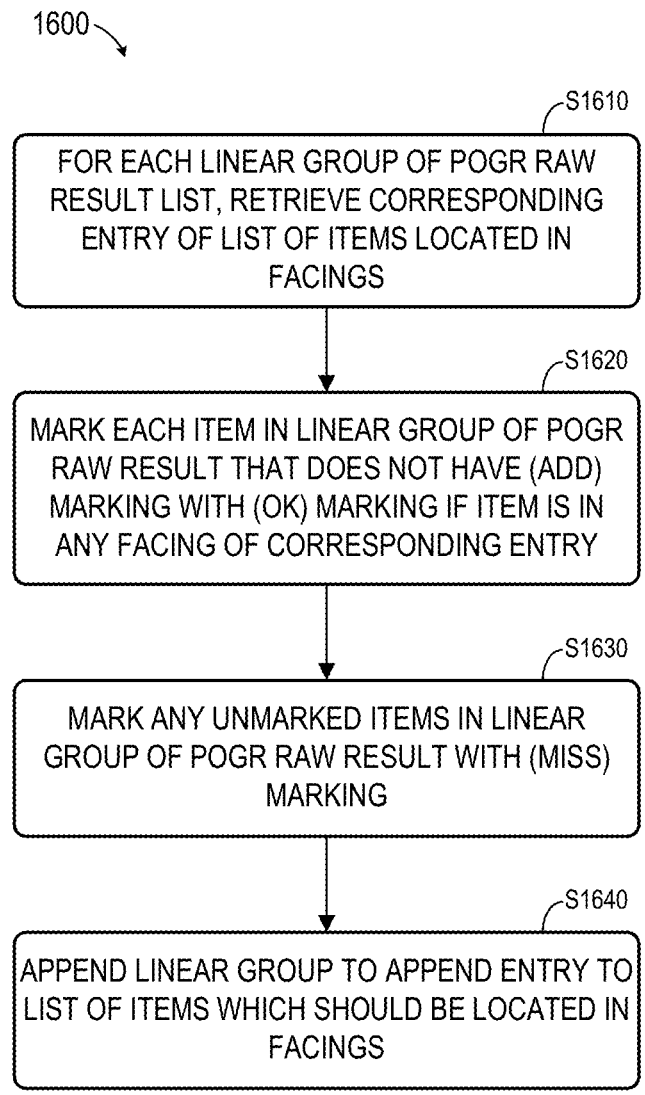
FIG. 16 is a flow diagram of a process to determine items which should be located in facing spaces according to some embodiments.

As mentioned above, process 1000 is an embodiment of S630 of process 600. Returning to process 600, items which should be in the facing spaces are determined at S640, based on the planogram raw result list created at S620. Process 1600 of FIG. 16 is a detailed example of S640 according to some embodiments.

At S1610, and for each linear group of the planogram raw result list, a corresponding entry of the list of items located in facing spaces is retrieved. With reference to the above examples, FIG. 17a is an entry corresponding to linear group LG1 of the planogram raw result list and FIG. 17b is the corresponding entry of the list of items located in facing spaces retrieved at S1610.

At S1620, each item of the linear group of FIG. 17a which does not have an (ADD) marking in its corresponding facing of FIG. 17b, but which is located in any facing of FIG. 17b, is marked (OK). Such marking is shown in FIG. 17c. Any unmarked items are marked with the (MISS) marking in S1630, as shown in FIG. 17d. The resulting linear group is appended to the list of items which should be located in facings at S1640.

Figure 18A:
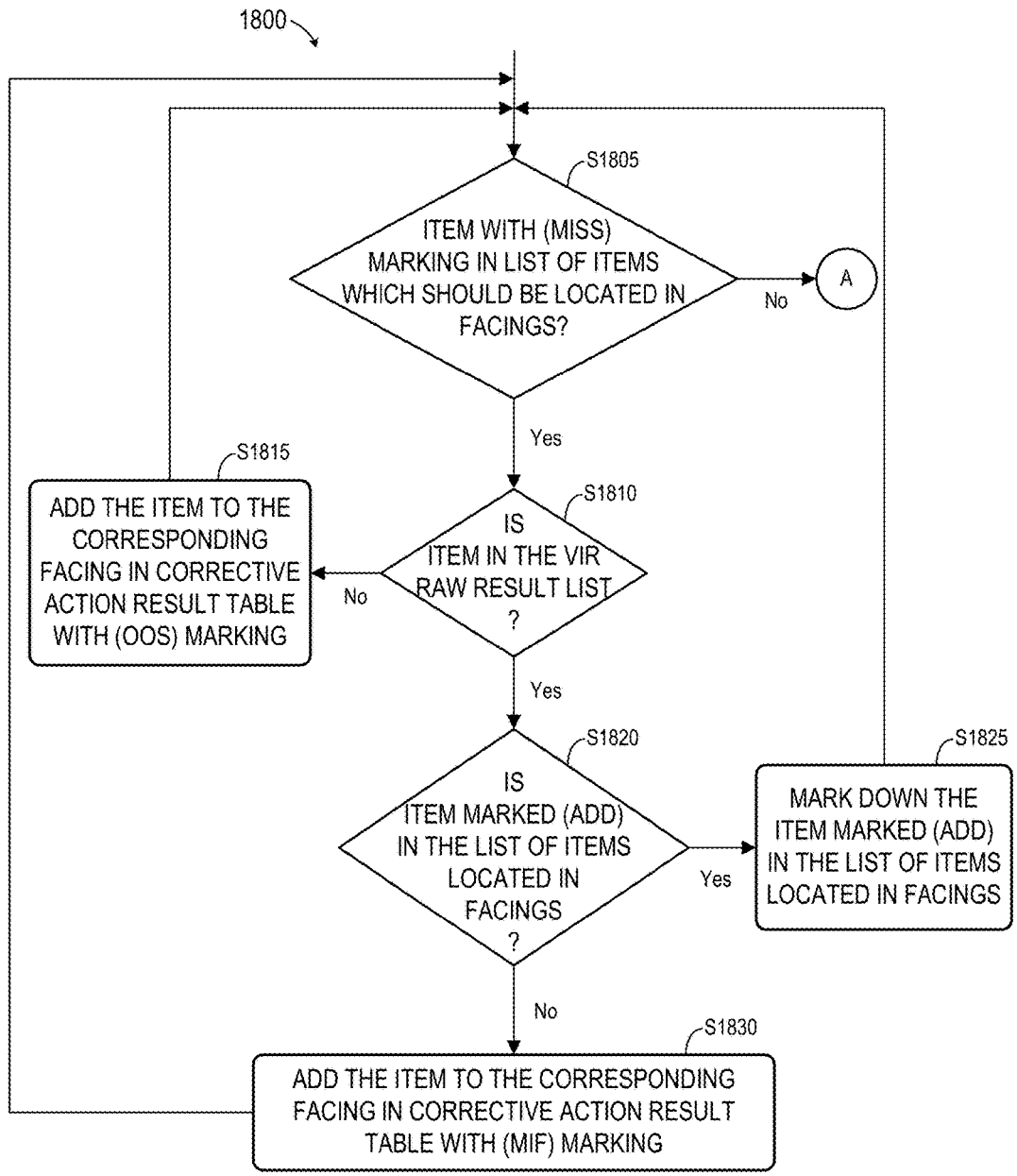
FIGS. 18a through 18c are a flow diagram of a process to determine corrective actions according to some embodiments.
Figure 18B:
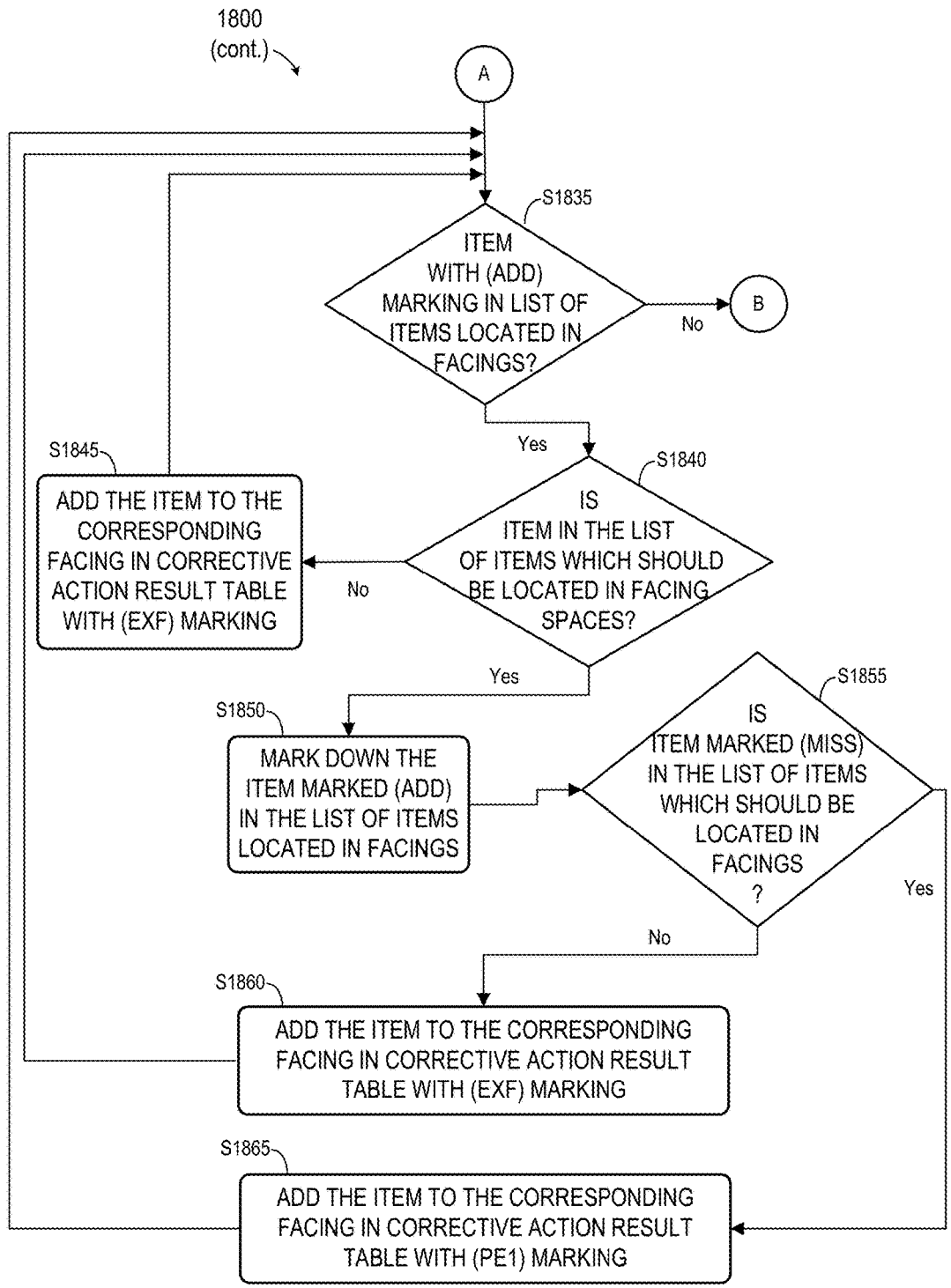
Figure 18C:
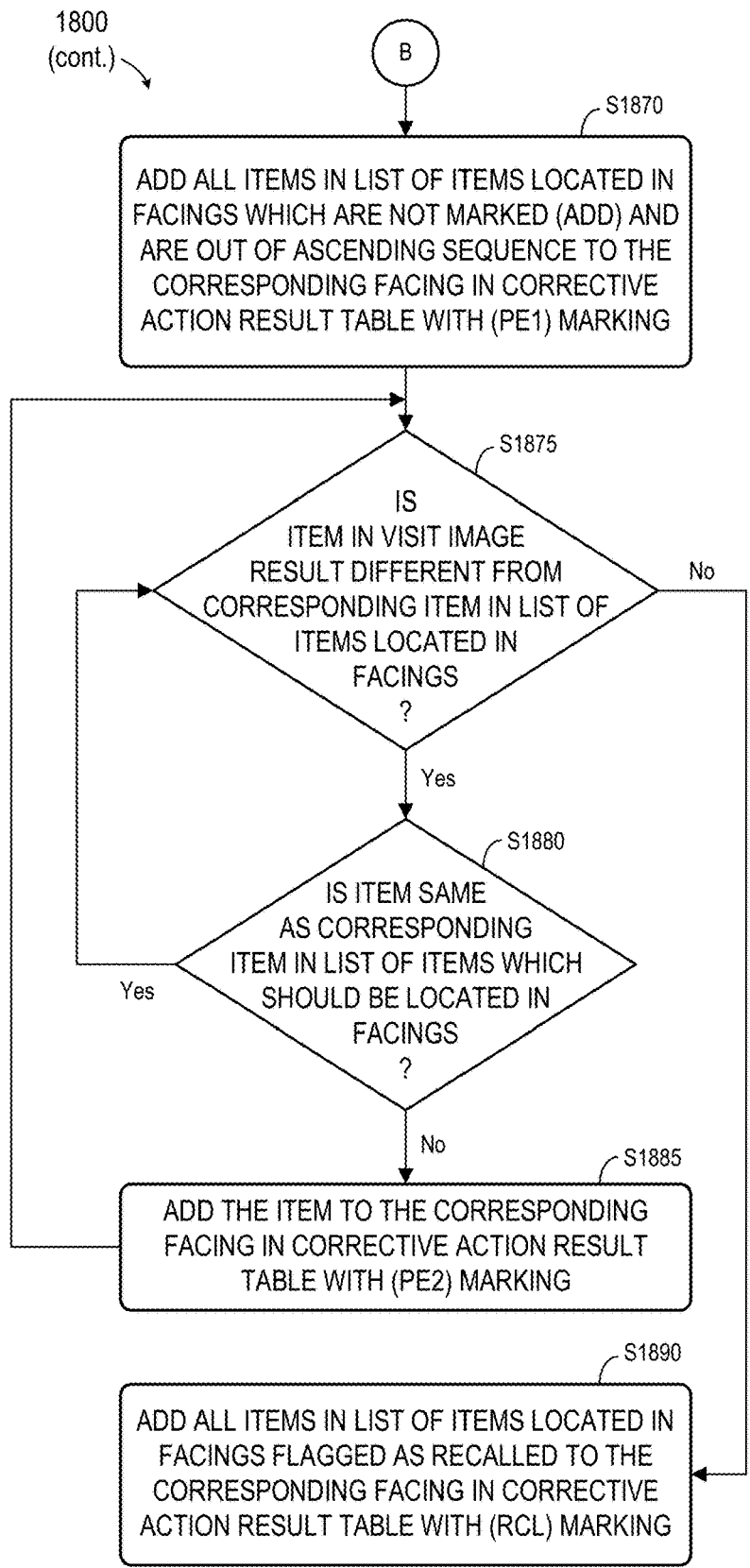

Corrective actions are determined at S650 based on the items determined at S630 and the items determined at S640. Process 1800 of FIGS. 18a-18c is a detailed example of the determination at S650 according to some embodiments.

At S1805, it is determined whether an item with the (MISS) marking is located in the list of items which should be located in the facings as determined at S630 and process 1000. Referring to FIG. 17d, the item of Facing 3 is marked (MISS) so flow proceeds to S1810, where it is determined whether the item is in the visit image result raw result list generated at S610. If not, the item is added to the corresponding facing in a corrective action result table with the marking (OOS). FIG. 19a shows such a table according to the present example.

At S1820, if the determination at S1810 is positive, it is determined whether an item marked (ADD) is in the list of items located in the facings, determined at S630. If so, the item marked (ADD) is marked down at S1825 so that it won't be found again for another item located at S1805.

If the determination at S1820 is negative, the item is added to the corresponding facing in the corrective action result table and marked (MIF) at S1830. Flow continues as described above until no more items are determined at S1805, at which point flow proceeds to S1835. At S1835, it is determined whether an item marked (ADD) is in the list of items located in facings. If so, it is determined at S1840 whether the same item is in the list of items which should be located in the facings. If not, the item is added to the corresponding facing in the corrective action result table and is marked (EXF), as shown in FIG. 19b.

If the determination at S1840 is positive, the item marked (ADD) of S1835 is marked down in the list of items located in the facings so that it won't be found again at S1835. Next, it is determined at S1855 whether an item in the list of items which should be located in the facings is marked (MISS). If not, the item is added to the corresponding facing of the corrective action result table and marked (EXF) in S1860, as shown in FIG. 19b. If so, the item is added to the corresponding facing of the corrective action result table and marked (PE1) in S1865. Flow continues as described above until no more items are determined at S1835, at which point flow proceeds to S1870.

At S1870, all items if the list of items located in the facings which are not marked (ADD) and are out of ascending sequence are added to the corresponding facing in the corrective action result table and marked (PE1).

At S1875, it is determined whether an item in the visit image result is different from a corresponding item in the list of items located in the facings. If such an item is found, it is determined at S1880 whether the item is the same as a corresponding item in the list of items which should be located in the facings. If so, flow returns to S1875 to identify other differing items.

If not, the item is added to the corresponding facing in the corrective action result table and marked (PE2) at S1885. Flow continues in this manner until the determination at S1875 is negative. Then, at S1890, all items in the list of items located in the facing spaces which have been recalled are added to the corresponding facing in the corrective action result table and marked (RCL).

Aspects of the development, presentation, etc. of corrective actions as described above may be augmented or enhanced in any number of ways. For example:

1) Various virtual reality, augmented reality, etc., display or presentation devices may be employed.

2) The shelves in a retail environment may contain hundreds, thousands, etc. of products spread across multiple, lengthy isles, making it challenging to among other things recognize, identify, etc. individual product facings. In order to view various product shelf facings that may be indicated as needing corrective action, a user may need to continuously make numerous adjustments on their device including zooming in/out, panning left/right/up/down, scrolling left/right/up/down, etc. Such adjustments may be time consuming, may result in loss of context or orientation, etc.

An Astral Navigation capability provides among other things automated zoom, panning, scrolling, etc. navigational views of inter alia a display shelf image which allows a user to quickly and easily "fly" from one corrective action selection to any other corrective action selection, optionally viewing a corrective action selection from multiple visual perspectives. Such a seamless "flight" significantly enhances a user's ability to quickly and accurately locate and address corrective action facings on for example shelf displays (which may contain hundreds, thousands, etc. of similar looking products and span multiple isles).

3) Various corrective actions may be dynamically aggregated, grouped, etc. in connection with inter alia presentation and review with for example different search, filter, etc. capabilities.

Figure 22:
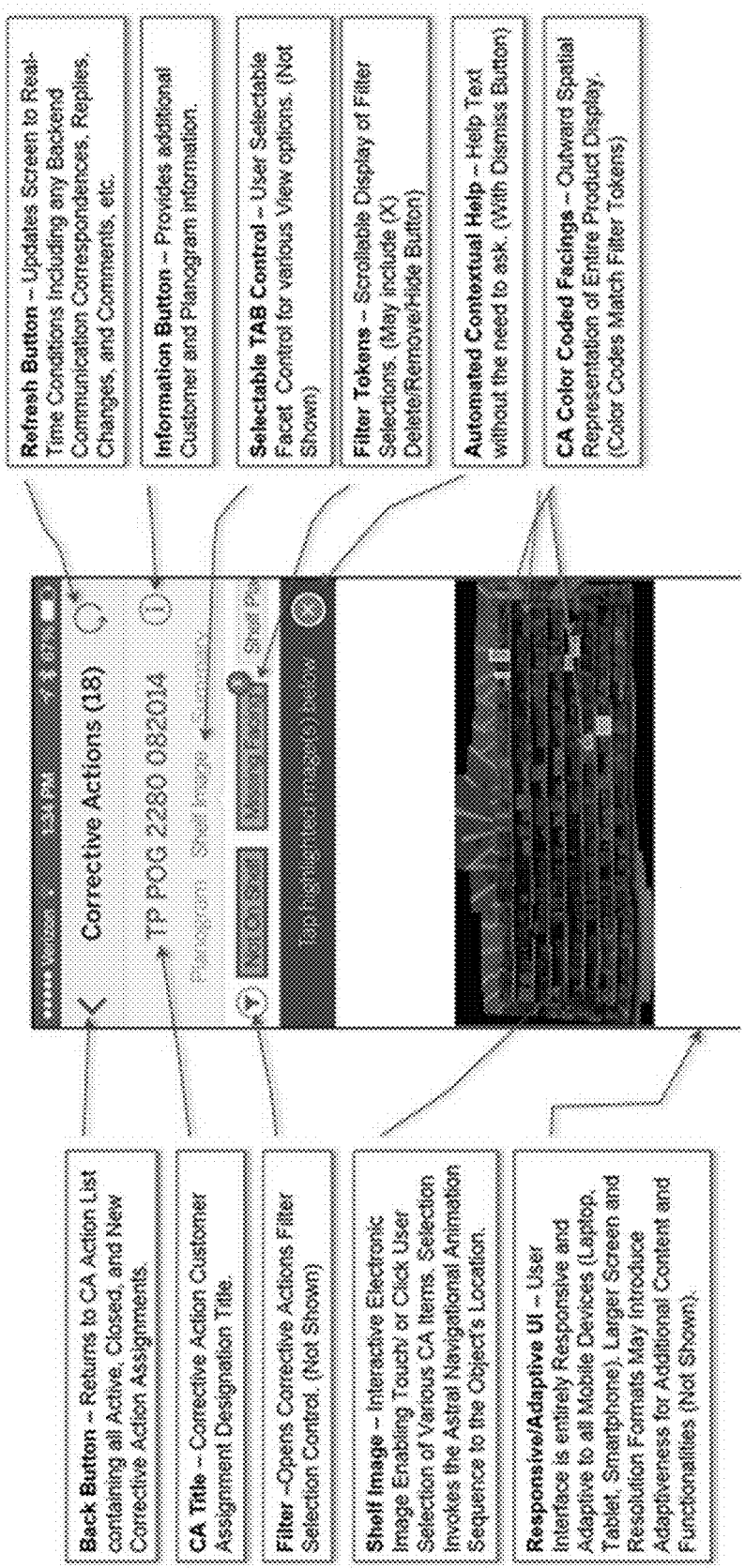
FIG. 22 depicts an illustrative start display that may be possible according to some embodiments.
Figure 23:
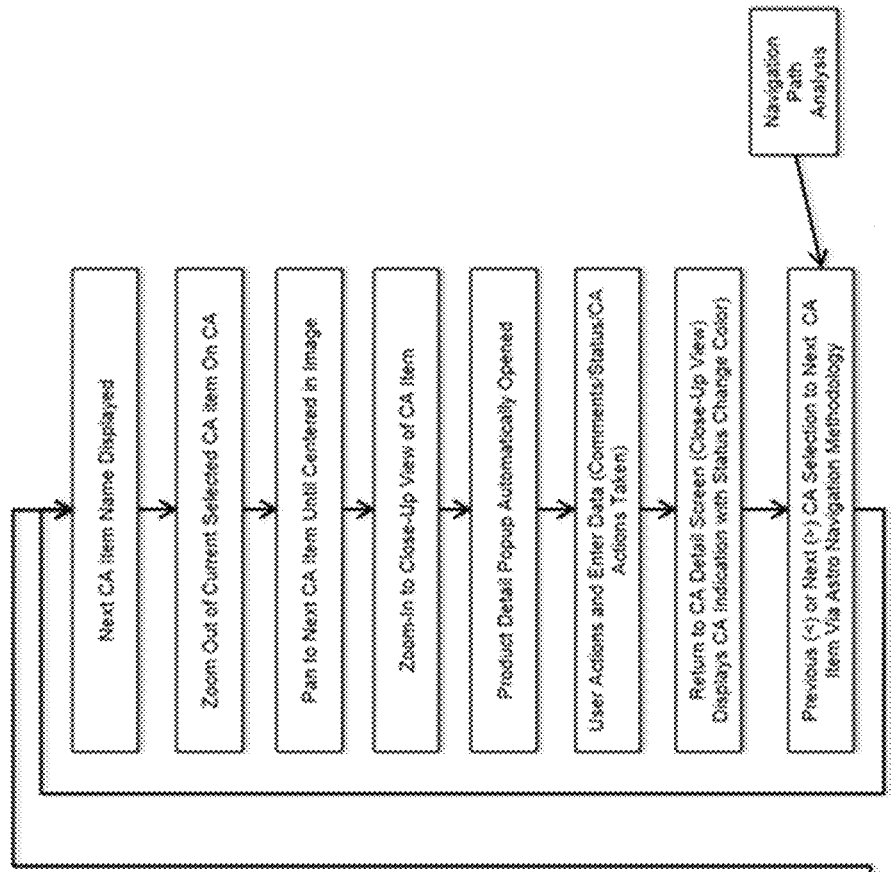
FIG. 23 is a flow diagram that depicts aspects of an Astral Navigation capability.
Figure 23:
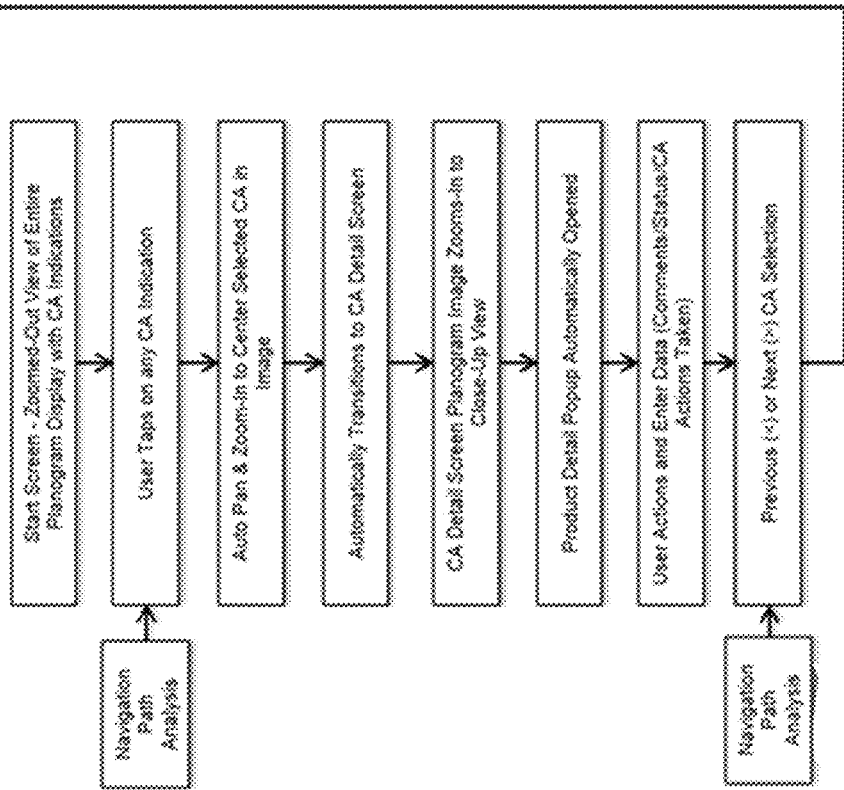

FIG. 23 presents various of the steps, actions, etc. that may be possible with aspects of an Astral Navigation capability as described above, with FIG. 22 presenting aspects of an illustrative start display.

FIGS. 21a through 21e depict an illustrative sequence of displays that may be possible in connection with the various actions, processing activities, etc. that were presented above.

Figure 21A:
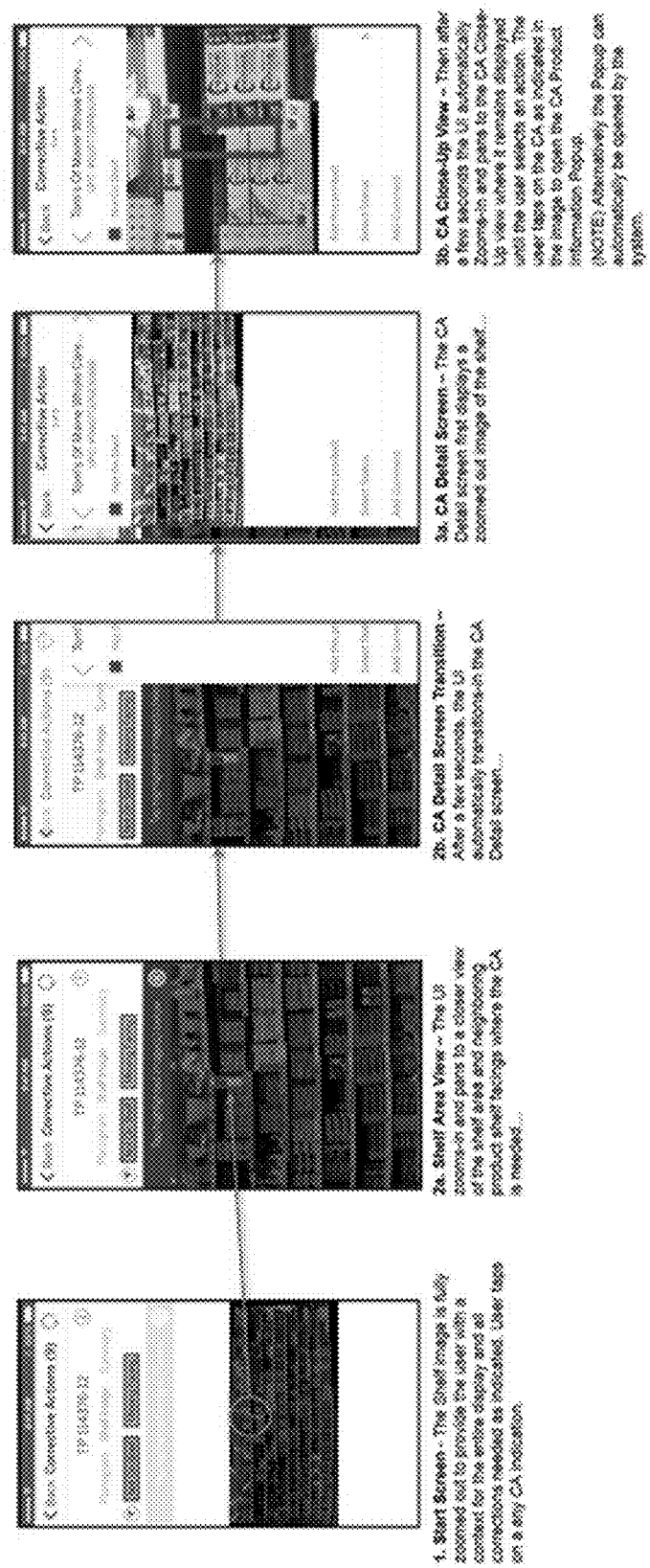
FIGS. 21a through 21e depict an illustrative sequence of displays that may be possible according to some embodiments.
Figure 21B:
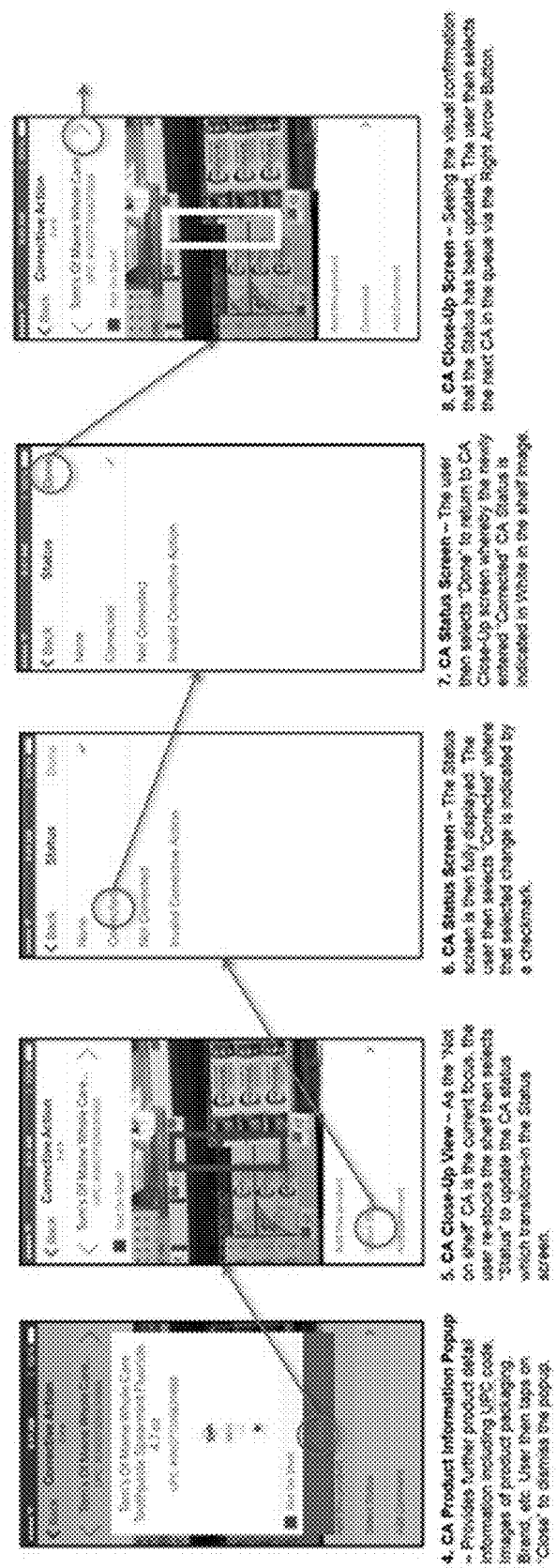
Figure 21C:
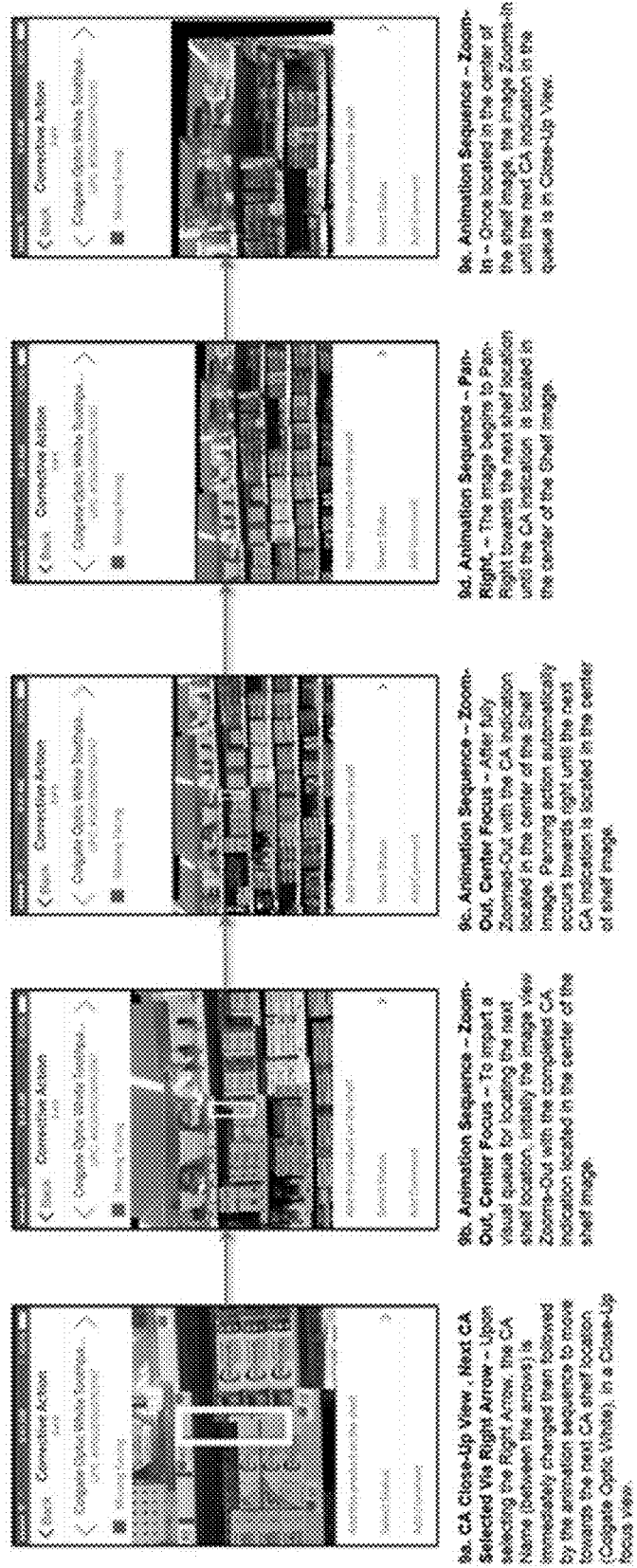
Figure 21D:
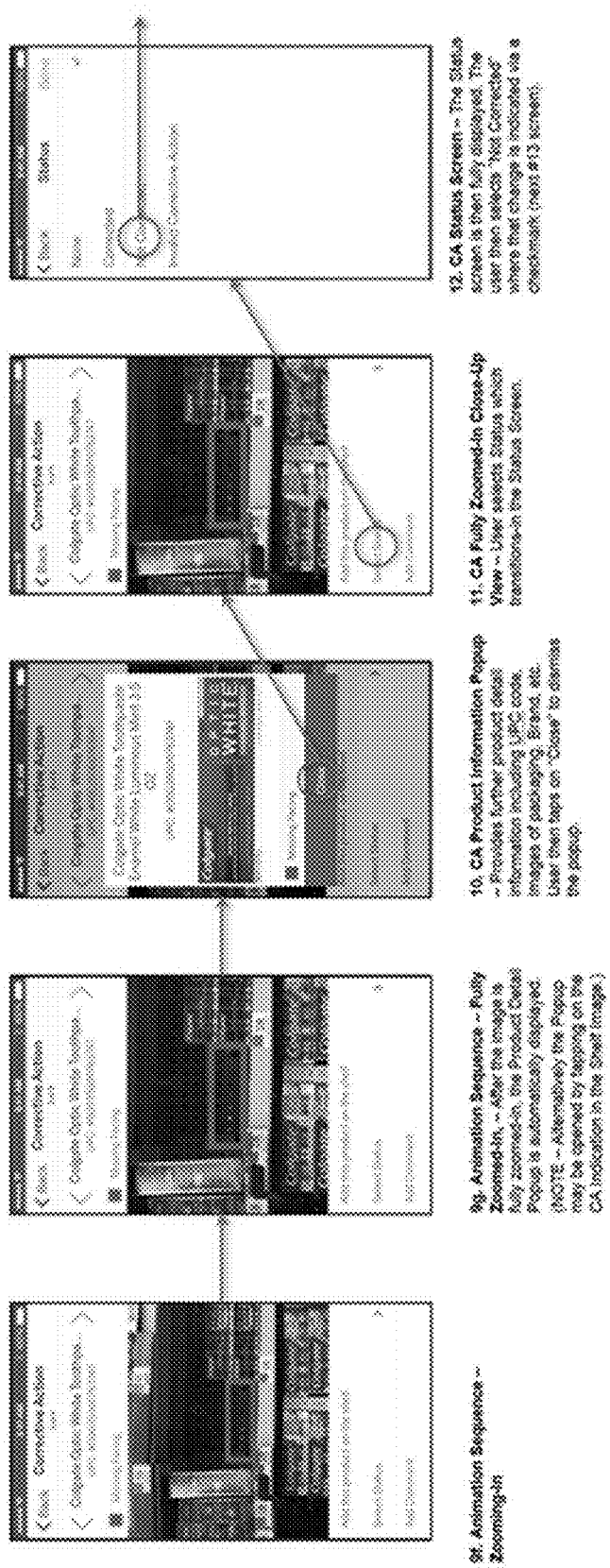
Figure 21E:
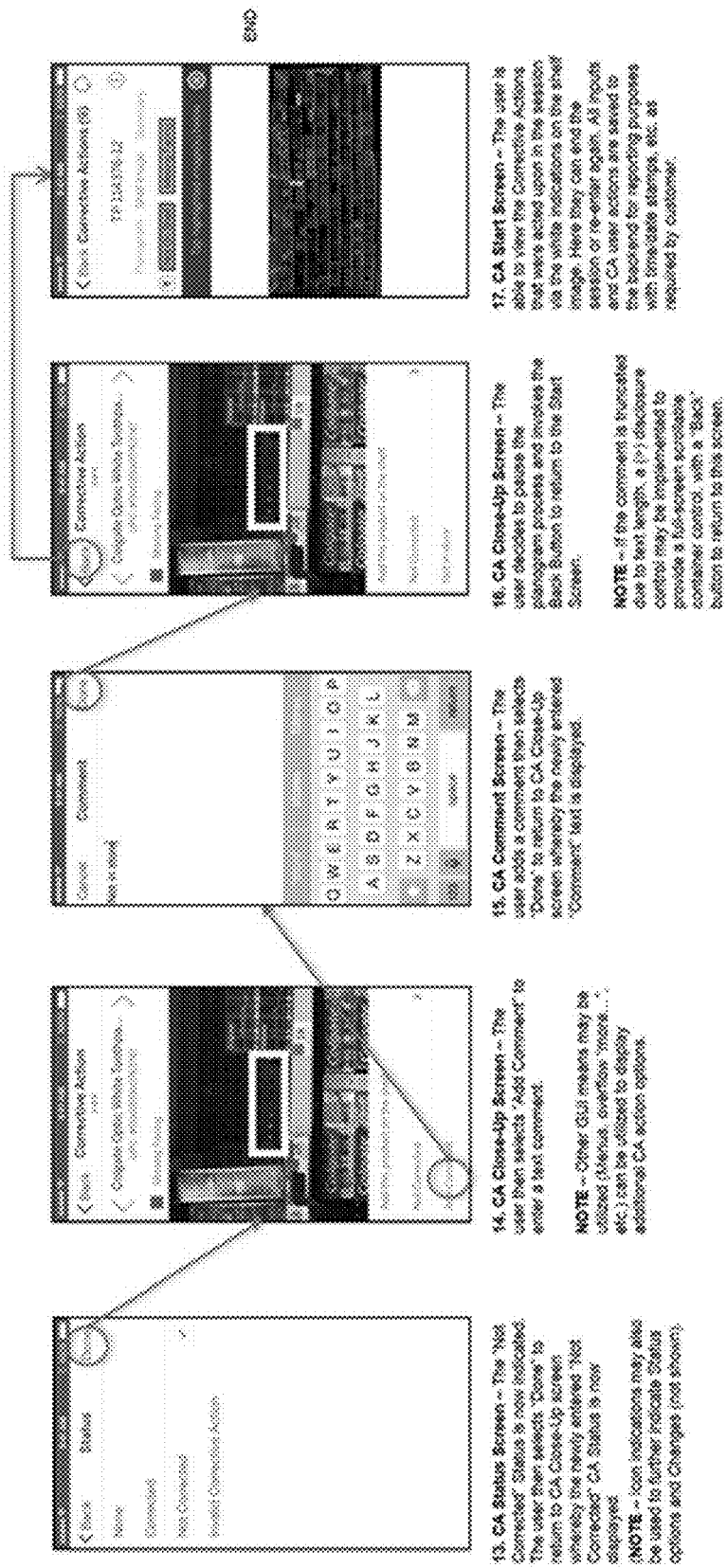

In connection with screen image 8 in FIG. 21b, the order of a next selection may be determined by the physical position of each corrective action item on a shelf. For example, each time a user selects a Right (>) button, the order of a next corrective action item shown may be horizontal, traversing from left to right, until all corrective action items on a shelf have been shown. Then, on a next selection of a Right (>) button, the process may move to a next (e.g., lower) shelf and once again iterate horizontally (e.g., from left to right) across the shelf to each corrective action item on the shelf. A Left (<) button may iterate through corrective action items in a reverse fashion (i.e., right to left, bottom to top). Following each selection of a Right (>) button or a Left (<) button the screen image sequence 9a through 9b (see FIG. 21c and FIG. 21d) may be presented, providing a user with an Astral Navigation experience of "flying" around a product display, store isles, etc. The actions and interactions that were just described are illustrative and it will be readily apparent to one of ordinary skill in the relevant are that numerous alternative actions and interactions are easily possible.

Figure 20:
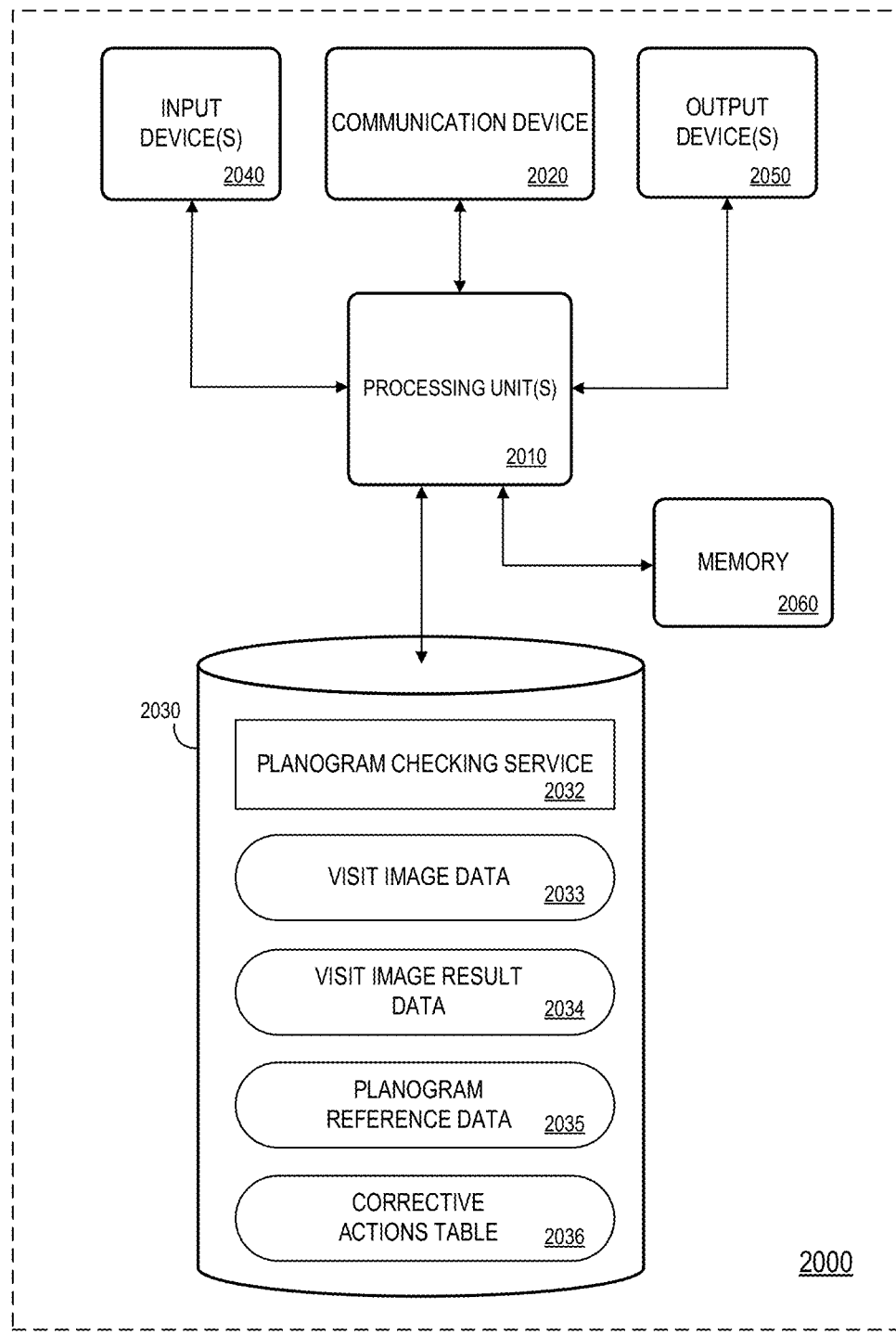
FIG. 20 is a block diagram of a computing system according to some embodiments.

FIG. 20 is a block diagram of system 2000 according to some embodiments. System 2000 may comprise a general-purpose computing system and may execute program code to perform any of the processes described herein. System 2000 may comprise an implementation of application server 110 and database 115 according to some embodiments. System 2000 may include other unshown elements according to some embodiments.

System 2000 includes processing unit(s) 2010 operatively coupled to communication device 2020, data storage device 2030, one or more input devices 2040, one or more output devices 2050 and memory 2060. Communication device 2000 may facilitate communication with external devices, such as a reporting client, or a data storage device. Input device(s) 2040 may comprise, for example, a keyboard, a keypad, a mouse or other pointing device, a microphone, knob or a switch, an infra-red (IR) port, a docking station, and/or a touch screen. Input device(s) 2040 may be used, for example, to enter information into apparatus 2000. Output device(s) 2050 may comprise, for example, a display (e.g., a display screen) a speaker, and/or a printer.

Data storage device 2030 may comprise any appropriate persistent storage device, including combinations of magnetic storage devices (e.g., magnetic tape, hard disk drives and flash memory), optical storage devices, Read Only Memory (ROM) devices, etc., while memory 2060 may comprise Random Access Memory (RAM).

Planogram checking service 2032 may comprise program code executed by processor 2010 to cause apparatus 2000 to perform any one or more of the processes described herein. Embodiments are not limited to execution of these processes by a single apparatus. Visit image data 2033, visit image result data 2034, planogram reference data 2035 and corrective actions table 2036 may include data as described above. As also described above, database 115 may be implemented using volatile memory such as memory 2060. Data storage device 2030 may also store data and other program code for providing additional functionality and/or which are necessary for operation of system 2000, such as device drivers, operating system files, etc.

Various of the system element, component, etc. exchanges or interactions that were presented above may incorporate aspects of inter alia one or more Application Programming Interfaces (APIs), one or more standards-based artifacts (such as for example JSON, XML, etc.), one or more custom artifacts, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Any of the methods described above may be implemented by processing units executing processor-executable program code stored in a memory. Processing units as described herein may be processors, processor cores, multi-core processors, etc.

Actual implementations may include software elements, hardware elements, or any combination thereof. For example, a system may be implemented using any number of computing devices, and one or more processors within the system may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

Embodiments described herein are solely for the purpose of illustration. Those in the art will recognize other embodiments may be practiced with modifications and alterations to that described above.

What is claimed is:

1. A computing system comprising:
   a memory storing processor-executable program code; and
   a processor to execute the processor-executable program code in order to cause the computing system to:
   acquire an electronic image of items disposed in first locations;
   determine, based on the acquired electronic image, a visit image result comprising a first one or more linear groups, a first one or more facings per linear group and a first zero or more product identifiers per facing, the visit image result including a unique identifier for the items in the acquired electronic image and indications of relative locations for those items, the linear groups including at least a portion of a shelf supporting the items in the acquired electronic image, and the facings each being a sub-portion of a linear group;
   filter the determined visit image result to remove items other than those items related to a first entity;
   determine planogram reference data comprising a second one or more linear groups, a second one or more facings per linear group and a second zero or more product identifiers per facing, the planogram reference data specifying expected item count, shelf configuration, shelf size, unique product identifier for the expected items and their corresponding location;
   determine, based on the planogram reference data, a table of items which should be located in the facings by:
   for each of the second one or more linear groups, retrieve a corresponding linear group of the table of items located in the facings;
   for each of the second one or more linear groups, mark all items with a second flag which are not marked with the first flag and which are also present in the corresponding linear group of the table of items located in the facings; and
   for each of the second one or more linear groups, mark all unmarked items with a third flag, the third flag indicating that an item is missing from the facings; and
   determine one or more corrective actions based on the visit image result and on the planogram reference data, determination of the one or more corrective actions comprises:
   for each of the second one or more linear groups, determine all items marked with the third flag;
   for each of the items marked with the third flag, determine whether the item is present in the visit image result;
   for each of the items marked with the third flag and not present in the visit image result, associate the item with a corresponding facing of a corrective action result table and mark the item with a flag indicating that the item is out of stock; and
   for each of the items marked with the third flag and present in the visit image result, and if the item is not marked with the first flag, associate the item with a corresponding facing of a corrective action result table and mark the item with a flag indicating that the item is partially missing from the corresponding facing.

2. A computing system according to claim 1, wherein the processor is further to execute the processor-executable program code in order to cause the computing system to:
   determine, based on the visit image result, a table of items located in facings by:
   creation, for each of the first one or more linear groups, of a plurality of combinations of items matching items in a corresponding one of the second one or more linear groups;
   determination of a best matching combination of the plurality of combinations of items matching items for each of the first one or more linear groups; and
   population of any empty facings in each of the plurality of determined best matching combinations,
   wherein the one or more corrective actions are determined based on the table of items located in facings and on the planogram reference data.

3. A computing system according to claim 2, wherein the processor is further to execute the processor-executable program code in order to cause the computing system to:
   determine a table of items which should be located in the facings based on the planogram reference data and on the table of items located in the facings,
   wherein the one or more corrective actions are determined based on the table of items located in the facings and on the table of items which should be located in the facings.

4. A computing system according to claim 2, wherein population of any empty facings comprises population of any empty facings in each of the plurality of determined best matching combinations with an item and a first flag.

5. A computing system according to claim 1, wherein determination of the one or more corrective actions comprises:
   determination of at least one of: the item is out of stock; the item is partially missing from a corresponding facing; the item is present in a corresponding facings in too great a quantity; and the product has been recalled.

6. A non-transitory computer-readable medium storing program code, the program code executable by a processor of a computing system to cause the computing system to:
   acquire an electronic image of items disposed in first locations;
   determine, based on the acquired electronic image, a visit image result comprising a first one or more linear groups, a first one or more facings per linear group and a first zero or more product identifiers per facing, the visit image result including a unique identifier for the items in the acquired electronic image and indications of relative locations for those items, the linear groups including at least a portion of a shelf supporting the items in the acquired electronic image, and the facings each being a sub-portion of a linear group;
   filter the determined visit image result to remove items other than those items related to a first entity;
   determine planogram reference data comprising a second one or more linear groups, a second one or more facings per linear group and a second zero or more product identifiers per facing, the planogram reference data specifying expected item count, shelf configuration, shelf size, unique product identifier for the expected items and their corresponding location;
   determine, based on the planogram reference data, a table of items which should be located in the facings by:
   for each of the second one or more linear groups, retrieve a corresponding linear group of the table of items located in the facings;
   for each of the second one or more linear groups, mark all items with a second flag which are not marked with the first flag and which are also present in the corresponding linear group of the table of items located in the facings; and for each of the second one or more linear groups, mark all unmarked items with a third flag, the third flag indicating that an item is missing from the facings; and determine one or more corrective actions based on the visit image result and on the planogram reference data, the determination of the one or more corrective actions comprises:

for each of the second one or more linear groups, determine all items marked with the second flag;

for each of the items marked with the second flag, determine whether the item is present in the visit image result;

for each of the items marked with the second flag and not present in the visit image result, associate the item with a corresponding facing of a corrective action result table and mark the item with a flag indicating that the item is out of stock; and for each of the items marked with the second flag and present in the visit image result, and if the item is not marked with the first flag, associate the item with a corresponding facing of a corrective action result table and mark the item with a flag indicating that the item is partially missing from the corresponding facing.

7. A medium according to claim 6, the program code executable by a processor of a computing system to cause the computing system to:

determine, based on the visit image result, a table of items located in facings by:

creation, for each of the first one or more linear groups, of a plurality of combinations of items matching items in a corresponding one of the second one or more linear groups;

determination of a best matching combination of the plurality of combinations of items matching items for each of the first one or more linear groups; and population of any empty facings in each of the plurality of determined best matching combinations, wherein the one or more corrective actions are determined based on the table of items located in facings and on the planogram reference data.

8. A medium according to claim 7, the program code executable by a processor of a computing system to cause the computing system to:

determine a table of items which should be located in the facings based on the planogram reference data and on the table of items located in the facings, wherein the one or more corrective actions are determined based on the table of items located in the facings and on the table of items which should be located in the facings.

9. A medium according to claim 7, wherein population of any empty facings comprises population of any empty facings in each of the plurality of determined best matching combinations with an item and a first flag.

10. A medium according to claim 6, wherein determination of the one or more corrective actions comprises:

determination of at least one of: the item is out of stock; the item is partially missing from a corresponding facing; the item is present in a corresponding facings in too great a quantity; and the product has been recalled.

11. A computer-implemented method comprising:

acquiring an electronic image of items disposed in first locations;

determining, based on the acquired electronic image, a visit image result comprising a first one or more linear groups, a first one or more facings per linear group and a first zero or more product identifiers per facing, the visit image result including a unique identifier for the items in the acquired electronic image and indications of relative locations for those items, the linear groups including at least a portion of a shelf supporting the items in the acquired electronic image, and the facings each being a sub-portion of a linear group;

filtering the determined visit image result to remove items other than those items related to a first entity;

determining, based on the visit image result, a table of items located in facings by:

creating, for each of the first one or more linear groups, of a plurality of combinations of items matching items in a corresponding one of the second one or more linear groups;

determining a best matching combination of the plurality of combinations of items matching items for each of the first one or more linear groups; and populating any empty facings in each of the plurality of determined best matching combinations;

determining planogram reference data comprising a second one or more linear groups, a second one or more facings per linear group and a second zero or more product identifiers per facing, the planogram reference data specifying expected item count, shelf configuration, shelf size, unique product identifier for the expected items and their corresponding location;

determining, based on the planogram reference data, a table of items which should be located in the facings by:

for each of the second one or more linear groups, retrieving a corresponding linear group of the table of items located in the facings;

for each of the second one or more linear groups, marking all items with a second flag which are not marked with the first flag and which are also present in the corresponding linear group of the table of items located in the facings; and for each of the second one or more linear groups, marking all unmarked items with a third flag, the third flag indicating that an item is missing from the facings; and determining one or more corrective actions based on the table of items located in facings and on the planogram reference data, the determining of the one or more corrective actions comprises:

for each of the second one or more linear groups, determining all items marked with the second flag;

for each of the items marked with the second flag, determining whether the item is present in the visit image result;

for each of the items marked with the second flag and not present in the visit image result, associating the item with a corresponding facing of a corrective action result table and mark the item with a flag indicating that the item is out of stock; and for each of the items marked with the second flag and present in the visit image result, and if the item is not marked with the first flag, associating the item with a corresponding facing of a corrective action result table and mark the item with a flag indicating that the item is partially missing from the corresponding facing.

12. A method according to claim 11, further comprising:
determining a table of items which should be located in the facings based on the planogram reference data and on the table of items located in the facings,
wherein the one or more corrective actions are determined based on the table of items located in the facings and on the table of items which should be located in the facings.

13. A method according to claim 11, wherein population of any empty facings comprises population of any empty facings in each of the plurality of determined best matching combinations with an item and a first flag.

14. A method according to claim 11, wherein determining the one or more corrective actions comprises:
determining at least one of: the item is out of stock; the item is partially missing from a corresponding facing; the item is present in a corresponding facings in too great a quantity; and the product has been recalled.

\* \* \* \* \*